US012761909B2

(12) United States Patent
Ganimastypalya et al.

(10) Patent No.: US 12,761,909 B2
(45) Date of Patent: Oct. 13, 2026

(54) PACKAGE CREATION IN A SOFTWARE PACKAGE MANAGEMENT SYSTEM

(71) Applicant: Infor (US), LLC, New York City, NY (US)

(72) Inventors: Manjunath Ganimastypalya, Duluth, GA (US); Kushal Raj Chavan, Frisco, TX (US)

(73) Assignee: Infor (US), LLC, New York City, NY (US)

(*) Notice: Subject to any disclaimer, the term of this patent is extended or adjusted under 35 U.S.C. 154(b) by 68 days.

(21) Appl. No.: 18/388,261

(22) Filed: Nov. 9, 2023

(65) Prior Publication Data

US 2024/0160439 A1 May 16, 2024

Related U.S. Application Data

(60) Provisional application No. 63/424,481, filed on Nov. 10, 2022.

(51) Int. Cl.

| | |
|---|---|
| ***G06F 15/16*** | (2006.01) |
| ***G06F 8/61*** | (2018.01) |
| ***G06F 8/71*** | (2018.01) |
| ***G06F 9/455*** | (2018.01) |
| ***G06F 9/48*** | (2006.01) |
| ***G06F 9/50*** | (2006.01) |
| ***G06F 9/54*** | (2006.01) |
| ***G06F 11/14*** | (2026.01) |
| ***H04L 12/24*** | (2006.01) |

(52) U.S. Cl.
CPC . *G06F 8/71* (2013.01); *G06F 8/61* (2013.01)

(58) Field of Classification Search
CPC ..... G06F 8/71; G06F 8/61; G06F 8/60; G06F 8/36; G06F 8/33; G06F 16/213; G06F 16/215; G06F 9/44505; G06F 9/4401; G06F 9/4403; G06F 8/656; G06F 9/44557; G06F 8/654; G06F 16/248; G06F 16/258; G06F 16/211; G06F 9/5072; G06F 8/41; G06F 9/45541; G06F 9/44589; G06F 9/485
See application file for complete search history.

(56) References Cited

U.S. PATENT DOCUMENTS

| | | | | |
|---|---|---|---|---|
| 11,818,232 | B2 | 11/2023 | Carr | |
| 11,841,772 | B2 * | 12/2023 | Azaria | G06F 11/1469 |
| 2004/0153990 | A1 | 8/2004 | Chen | |
| 2008/0162491 | A1 | 7/2008 | Becker et al. | |

(Continued)

OTHER PUBLICATIONS

International Search Report and Written Opinion received for PCT Application No. PCT/IB2023/061343, mailed on Jan. 5, 2024, 9 pages.

*Primary Examiner* — Thuy Dao

(57) ABSTRACT

Disclosed are various embodiments for a software package management system. In an embodiment, it is determined to create a package corresponding to differences in data for a plurality of applications in a first tenant environment of a networked system as compared to a second tenant environment of the networked system. The package is generated based at least in part on the differences in the data for the plurality of applications in the first tenant environment as compared to the second tenant environment. The package is stored in a package repository data store.

20 Claims, 15 Drawing Sheets

(56) References Cited

U.S. PATENT DOCUMENTS

| | | | | |
|---|---|---|---|---|
| 2014/0019798 | A1* | 1/2014 | Allison | G06F 16/10 714/4.3 |
| 2014/0033188 | A1* | 1/2014 | Beavers | G06F 8/65 717/170 |
| 2015/0120893 | A1 | 4/2015 | Sapaliga | |
| 2015/0242197 | A1 | 8/2015 | Alfonso | |
| 2015/0286690 | A1 | 10/2015 | Hu | |
| 2016/0321248 | A1 | 11/2016 | Narayan et al. | |
| 2017/0003947 | A1 | 1/2017 | Brooks | |
| 2017/0123785 | A1 | 5/2017 | Hofhansl | |
| 2019/0306237 | A1 | 10/2019 | Srinivasan et al. | |
| 2021/0021423 | A1 | 1/2021 | Latorre et al. | |
| 2021/0026621 | A1* | 1/2021 | Fox | G06F 8/656 |
| 2021/0112138 | A1 | 4/2021 | Peter | |
| 2022/0082627 | A1* | 3/2022 | O'Mahony | G01R 31/389 |
| 2022/0350586 | A1* | 11/2022 | Moran | G06F 8/61 |
| 2023/0281339 | A1 | 9/2023 | Chen et al. | |
| 2023/0289344 | A1 | 9/2023 | Fuglsang et al. | |

* cited by examiner

PACKAGE CREATION IN A SOFTWARE PACKAGE MANAGEMENT SYSTEM

CROSS-REFERENCE TO RELATED APPLICATION

This application claims the benefit of, and priority to, U.S. Provisional Application 63/424,481, entitled "SOFTWARE PACKAGE MANAGEMENT SYSTEM," and filed on Nov. 10, 2022, which is incorporated herein by reference in its entirety.

BACKGROUND

Enterprise resource planning (ERP) software is a type of business management software that provides a continuous view of core business processes of an enterprise. ERP software can track business resources, such as building space, production capacity, funding, and product inventory, and business commitments, such as customer orders, vendor purchase orders, accounts receivable, payroll, and so on. An ERP computer system may include a number of different specialized applications, such as human resources, accounting, production, procurement, sales, customer services, distribution, corporate performance and governance, and so on. These applications may use and generate data, and the data may be shared across the applications of the ERP computer system.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
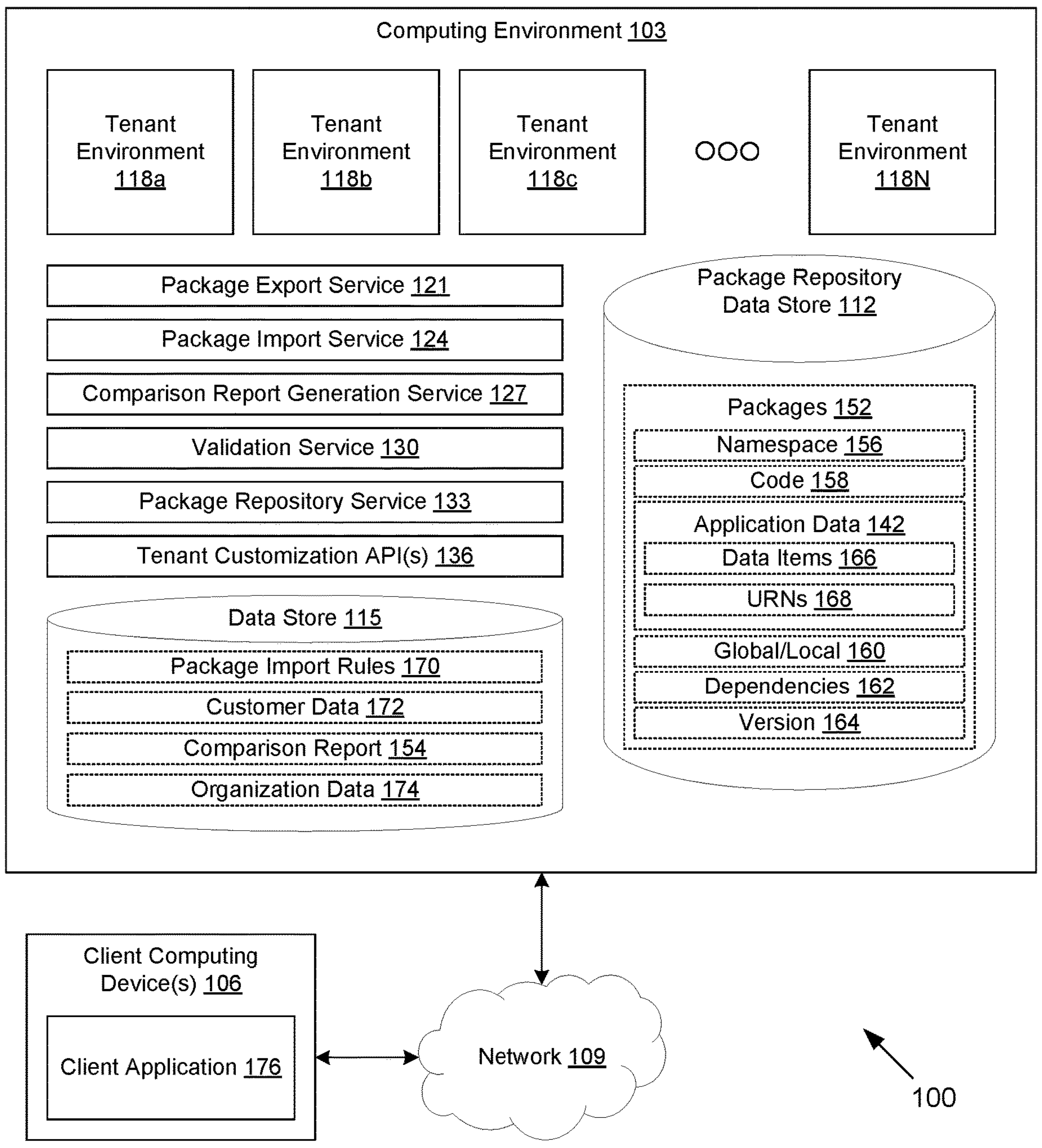
FIG. 1 is a schematic block diagram of a networked environment according to various embodiments of the present disclosure.

The present disclosure relates to a software package management system for managing complex software installations in multi-tenant environments. For example, the software package management system may be used to manage ERP applications or other software systems. In the context of ERP, there are many different industries, each with their own specific business processes and requirements. A one-size-fits-all approach is inadequate given the differences between industries. An ERP system for the aerospace manufacturing industry will have vastly different functionality as compared to an ERP system for the hospitality service industry. These differences may translate into different constituent applications or modules and different configuration data.

Consequently, deploying an ERP system for a specific business typically involves a great deal of customization to make it work effectively for the respective industry and for the specific business. Such customization may be performed by the ERP vendor, a deployment partner, or staff or contractors of the business. Cloud-based ERP systems are typically multi-tenant systems deployed across cloud computing resources to enable hosting for a multitude of different customers of the cloud-based ERP system (e.g., companies), and access by those customers from a number of different locations. Configuring or deploying an ERP system may involve entering data via a web-based interface, an interface of a locally executed application, and/or by way of an application programming interface (API). Given the number of configuration settings and parameters that are typically customized, it can be time consuming and costly to perform a deployment. Likewise, transferring configuration settings and other data from one environment to another may be onerous.

As part of development cycles, administrators or other users associated with customers may promote changes from one environment to another, such as from development to testing, and from testing to production. The process of exporting and importing specific data sets from one environment to another environment is a typically tedious manual process that is error prone. The errors can often result in delays in implementation. In addition to export or import of data, it may be helpful for users to be able to compare the changes between two environments and then import the changes into a target environment.

Various embodiments of the present disclosure introduce a software package management system that enables data to be easily and automatically transferred from one environment to another. By generating a package, a user associated with a customer of a cloud-based ERP system is able to replicate data such as configuration settings from one environment to a number of different environments. In one embodiment, a user associated with a customer may create a package corresponding to the difference in data from a first environment to a second environment. User interfaces enable users to drill down into the different types of data to see the changes that would be applied to an environment by loading a package. Additionally, a party may develop a customization that may be useful to multiple other businesses. Such packages may be called global packages, as they may be imported by multiple customers of the cloud-based software system.

As one skilled in the art will appreciate in light of this disclosure, certain embodiments may be capable of achieving certain advantages, including some or all of the following: (1) improving the functioning of computing systems by reducing errors in software configurations by automatically exporting and importing configurations and other data; (2) improving the functioning of computing systems by automatically generating packages based upon differences in data in multiple environments; (3) improving the functioning of computing systems by facilitating sharing of configurations and other data through global packages in a multi-tenant, multi-customer cloud computing environment; and so forth.

In the following discussion, a general description of the system and its components is provided, followed by a discussion of the operation of the same.

With reference to FIG. 1, shown is a networked environment 100 according to various embodiments. The networked environment 100 includes a computing environment 103 and one or more client computing devices 106, which are in data communication with each other via a network 109. The network 109 includes, for example, the Internet, intranets, extranets, wide area networks (WANs), local area networks (LANs), wired networks, wireless networks, cable networks, satellite networks, or other suitable networks, etc., or any combination of two or more such networks.

The computing environment 103 may comprise, for example, a server computer or any other system providing computing capability. Alternatively, the computing environment 103 may employ a plurality of computing devices that may be arranged, for example, in one or more server banks or computer banks or other arrangements. Such computing devices may be located in a single installation or may be distributed among many different geographical locations. For example, the computing environment 103 may include a plurality of computing devices that together may comprise a hosted computing resource, a grid computing resource, and/or any other distributed computing arrangement. In some cases, the computing environment 103 may correspond to an elastic computing resource where the allotted capacity of processing, network, storage, or other computing-related resources may vary over time.

Various applications and/or other functionality may be executed in the computing environment 103 according to various embodiments. Also, various data is stored in a package repository data store 112 and a data store 115 that are accessible to the computing environment 103. The package repository data store 112 and the data store 115 may be representative of a plurality of data stores as can be appreciated. The data stored in the package repository data store 112 and the data store 115, for example, is associated with the operation of the various applications and/or functional entities described below.

The components executed on the computing environment 103, for example, include a plurality of tenant environments 118*a*, 118*b*, 118*c*, . . . 118N, a package export service 121, a package import service 124, a comparison report generation service 127, a validation service 130, a package repository service 133, a tenant customization API 136, and other applications, services, processes, systems, engines, or functionality not discussed in detail herein.

The tenant environments 118 respectively correspond to application environments for specific customers that are hosted on a shared application farm. For example, the shared application farm may be implemented in a cloud computing resource, such as an elastic computing resource. In some embodiments, the tenant environments 118 may respectively be implemented in separate virtual machine instances, separate containers, or otherwise separate environments within the computing environment 103. In some embodiments, the tenant environments 118 implement a cloud-based ERP system. A particular tenant environment 118 may support multiple distinct organizations of a customer entity, such as different subsidiaries or divisions of the customer entity. For example, a manufacturing company may have manufacturing facilities, warehouses, distribution centers, etc., and each may be considered a respective organization. A single customer entity may have multiple tenant environments 118, corresponding, for example, to development tenants, test tenants, production tenants, and so on.

Figure 2:
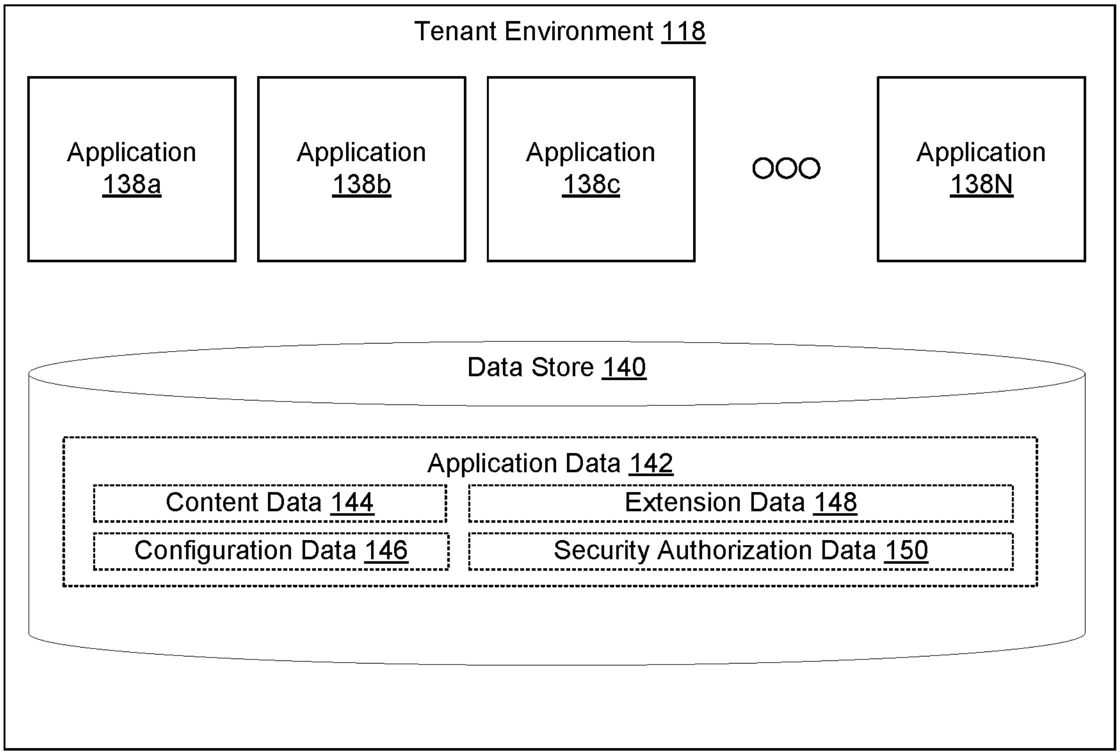
FIG. 2 is a schematic block diagram of a tenant environment according to various embodiments of the present disclosure.

Turning now to FIG. 2, shown is one example of a tenant environment 118. The tenant environment 118 may include a plurality of applications 138*a*, 138*b*, 138*c*, . . . 138N, a data store 140, and/or other applications and data. The applications 138 may correspond to various different applications of an ERP system, such as a human resources application, a payroll application, a supply chain management application, a manufacturing management application, a customer relationship management application, a purchasing application, an accounting application, a machine learning application, a collaboration application, a product lifecycle management application, a liquidity management application, a talent optimization application, a warehousing and transportation application, and so on. The ERP system may provide a catalog of such applications 138, which may be deployed as needed for particular customers. The applications 138 may be implemented as multi-tenant applications, such that a hosted instance of an application 138 may perform functions on behalf of multiple tenants and customer entities.

The data stored in the data store 140 includes, for example, application data 142, and potentially other data. The application data 142 may correspond to data that customizes the operation of particular applications 138 in the tenant environment 118 for the customer entity or an organization within or affiliated with the customer entity. The application data 142 may be maintained within one or more organization hierarchies for a customer entity. The specific organization hierarchy into which the data is organized may differ between customer types or industry verticals. For example, the data hierarchy for the manufacturing industry may be different from the data hierarchy for the services industry.

Each of the data items in the application data 142 may be associated with a unique uniform resource name (URN). The URN may incorporate data fields such as product line code, product code, module identifier, level of the data type, and an identifier of the specific data items.

For example, the application data 142 may include content data 144, configuration data 146, extension data 148, security authorization data 150, and other data. The content data 144 may correspond to specific artifacts that make a technology platform function in the context of the business domain. Non-limiting examples of these specific content artifacts may include widgets, workspaces, data flows, data loaders, connection points, mappings, file templates, monitors, alarm templates, workflows, activation policies, workflow schedules, business rules, API flows, value sets, document types, business context models, document output templates, requirement types, skills, personalization content, approval process templates, job positions, business controls, rule books, rules, and so forth.

The configuration data 146 may pertain to system, functional, or infrastructure-specific settings that control the behavior of one or more of the applications 138. Non-limiting examples of configuration settings may correspond to codes such as reason codes, bank codes, pay codes, and so on, parameters such as order entry parameters, purchase entry parameters, and so on, types such as order types, purchase order types, sales order types, and so on, methods such as goods receipts methods, distribution methods, and so on, calendar setup parameters, accounting periods, generic printer settings, security role changes, organization structure configuration, and so on.

The extension data 148 may include features that are developed by the ERP provider, development partners, or customers using the platform that is used to develop the applications 138. Non-limiting examples of extension data 148 includes custom reports, data views, scripts, event analytics, patch maintenance control for reports, session extensions, table extensions, business object extensions, customer-defined fields for forms, and so on.

The security authorization data 150 includes security roles and security role definitions with permission mapping. For example, the security authorization data 150 may define a number of different staff roles for an organization and the security permissions that are associated with each of the roles.

Referring back to FIG. 1, the package export service 121 is executed to create packages 152 from data in a tenant environment 118. A package 152 is a collection of data items that can be used to configure the operation of applications 138, extend the functionality of applications 138, provide content to be used by the applications 138, create security authorizations for applications 138, and so on. The data items may comprise character strings, numbers, binary data, artificial intelligence models, workflows, widgets, or other types of data. In one embodiment, individual ones of the data items in the package 152 are assigned unique identifiers or names. In another embodiment, individual ones of the data items in the package 152 are assigned globally unique identifiers or names that are unique across all packages 152 in a package repository. A package 152 may comprise JavaScript Object Notation (JSON), Yet Another Markup Language (YAML), Extensible Markup Language (XML), or another data format. In one embodiment, a package 152 is organized as a collection of metadata files and data files. The metadata files may provide information on the application 138, modules, classification of data, and the different package items in a package 152.

In one embodiment, the package export service 121 generates a package 152 by exporting selected data items from a source tenant environment 118. In another embodiment, the package export service 121 generates a package 152 by exporting the differences in data between a first tenant environment 118 and a second tenant environment 118. The package export service 121 may export a package 152 as a local package that is usable only within tenant environments 118 associated with a single customer entity. Alternatively, the package export service 121 may export a package 152 as a global package that is usable within tenant environments 118 associated with multiple different customer entities. The package export service 121 creates the package 152 in the package repository data store 112.

The package import service 124 is executed to import packages 152 from the package repository data store 112 into a target tenant environment 118. In some cases, the target tenant environment 118 may be the original source tenant environment 118 for generating the package 152. In other cases, the target tenant environment 118 may be a different tenant environment 118 than was used in creating the package 152. As part of the import process, the package import service 124 may execute the comparison report generation service 127, the validation service 130, and or other services or components. Importing a package 152 may involve inserting data, updating data, deleting data, and/or other actions, for one or more applications 138. With a relational database, importing may involve insert, update, delete, and other queries. With blob storage, importing may involve the creation of new files, updating existing files, deleting files, etc.

The comparison report generation service 127 is executed to generate comparison reports 154, which indicate differences between the data in a target tenant environment 118 and the data being imported from a package 152. The comparison reports 154 enable a user to preview the changes that would be made by importing the package 152 before actually doing the import.

The validation service 130 performs a validation on the import of a package 152 to a target tenant environment 118 before the import is actually performed. In this way, the validation service 130 is able to confirm whether there are any missing dependencies or if there are any conflicts that would interfere with the import process of the package 152 to the target tenant environment 118.

The package repository service 133 is executed to store new packages 152 in the package repository data store 112 and/or facilitate retrieval of packages 152 from the package repository data store 112. With respect to global packages 152, the package repository service 133 may act as a marketplace to allow users associated with customer entities to purchase or license packages 152 that were created by others. The package repository service 133 may also enforce access restrictions that may allow users associated with certain customer entities to access certain packages 152 but not users associated with other customer entities, e.g., to ensure that a first customer entity does not have access to a local package 152 of a second customer entity. The package repository service 133 may also facilitate an approval process so that global packages 152 are appropriately validated, e.g., for security and errors, before users associated with other customer entities are able to obtain the global packages 152 via the package repository service 133.

The tenant customization APIs 136 are executed to provide access to configure the tenant environments 118 programmatically. In this way, a user can create new data parameters and/or change values of existing data parameters. A user may enable a particular application 138 or disable a particular application 138 for a tenant environment 118. For example, a user may create the data within a tenant environment 118 during a development phase. In some embodiments, the tenant customization APIs 136 provide web-based interfaces for editing and updating the data in the tenant environments 118. In other embodiments, the tenant customization APIs 136 receive inputs from a dedicated application such as a mobile application.

The data stored in the package repository data store 112 includes, for example, packages 152 and/or other data. Each package 152 may include data such as a namespace 156, a code 158, application data 142, a global/local parameter 161, one or more dependencies 162, one or more versions 164, and or other data. The namespace 156 uniquely identifies the data in the package 152 relative to other packages 152. The namespace 156 is created in one tenant environment 118, and as new data is created, the data can be associated with the namespace 156. The namespace 156 may be a globally unique identifier in the package repository data store 112. The code 158 may uniquely identify the package 152. For example, the code 158 may be a globally unique seven-character alphanumeric code. The unique name or identifier of each package item in a global package 152 may be unique across all package items of the same category across all global packages 152 in the package repository data store 112.

The application data 142 in the package 152 include one or more data items 166 and one or more corresponding URNs 168 that uniquely identify the corresponding data items 166. The global/local parameter 160 may indicate whether a given package 152 is a global package 152 capable of being installed across multiple customer entities, or is a local package 152 that can only be installed by users associated with the same customer entity that created it. The dependencies 162 may indicate other packages 152 or applications 138 upon which installation of the package 152 depends. The version 164 may uniquely identify a particular package version, where subsequent versions may replace an earlier package 152 having the namespace 156 and the code 158.

The data stored in the data store 115 includes, for example, one or more package import rules 170, customer data 172, one or more comparison reports 154, organization data 174, and potentially other data. The package import rules 170 may enable automatic import of packages 152 into a tenant environment 118. For example, when a tenant environment 118 is created for a particular customer or organization, the package import rules 170 may specify a number of local and/or global packages 152 to be imported, along with an order in which they are to be imported. Accordingly, the import of the packages 152 may be automatically triggered upon instantiation or deployment of the tenant environment 118.

The customer data 172 may include data regarding various customer entities of an ERP provider, such as tenant environments 118 associated with the customer, packages 152 created by the customer, general preferences of the customer, and so on. Each respective customer entity may be associated with a corresponding customer account with the ERP provider, though a given customer account may be associated with multiple user accounts. The comparison report 154 may be generated by the comparison report generation service 127 to indicate the data changes that would be performed to a target tenant environment 118 when importing a particular package 152. The organization data 174 may include data related to one or more organizations of a customer entity.

The client computing device 106 is representative of a plurality of client devices that may be coupled to the network 109. The client computing device 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, smartwatches, head mounted displays, voice interface devices, or other devices. The client computing device 106 may include a display comprising, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client computing device 106 may be configured to execute various applications such as a client application 176 and/or other applications. The client application 176 may be executed in a client computing device 106, for example, to access network content served up by the computing environment 103 and/or other servers, thereby rendering a user interface on the display. To this end, the client application 176 may comprise, for example, a browser, a dedicated application, etc., and the user interface may comprise a network page, an application screen, etc. In particular, the client application 176 may be used to interact with the tenant customization APIs 136 to configure a tenant environment 118, to create packages 152 via the package export service 121, to import packages 152 via the package import service 124, or to interact with other applications in the computing environment 103. The client computing device 106 may be configured to execute applications beyond the client application 176 such as, for example, email applications, social networking applications, word processors, spreadsheets, and/or other applications.

Figure 3A:
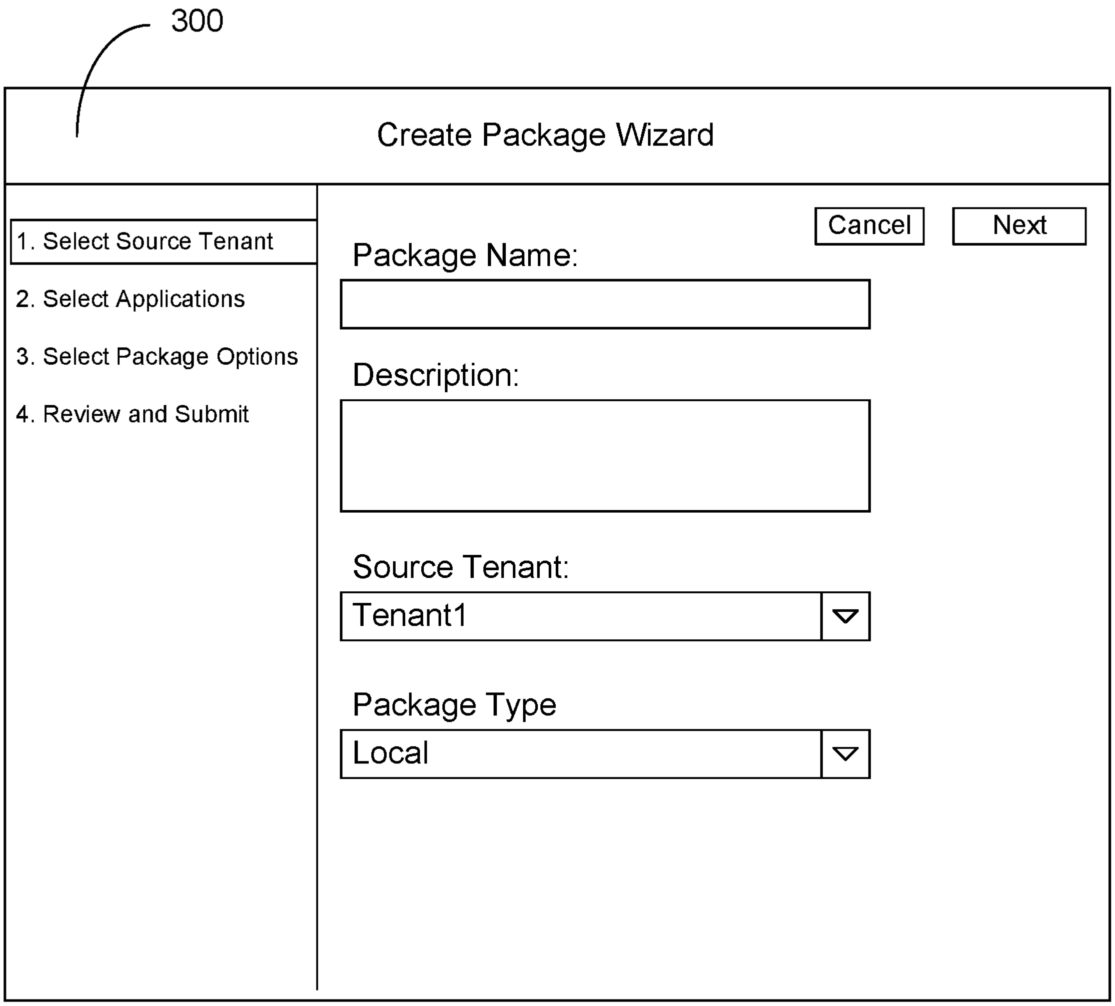
FIGS. 3A-3D are pictorial diagrams of example user interfaces corresponding to a package export process rendered by a client computing device in the networked environment of FIG. 1 according to various embodiments of the present disclosure.

Moving to FIG. 3A, shown is one example of a user interface 300 corresponding to a source tenant selection screen of a create package wizard implemented by a package export service 121 (FIG. 1). The user interface 300 enables the user to specify a particular package name, a description of the package 152 (FIG. 1), to select a source tenant environment 118 (FIG. 1) for creating the package 152, and to specify whether the package 152 will be a local package 152 or a global package 152. In other examples, the user interface 300 may include components to specify the namespace 156 (FIG. 1), the code 158 (FIG. 1), or other data items.

Figure 3B:
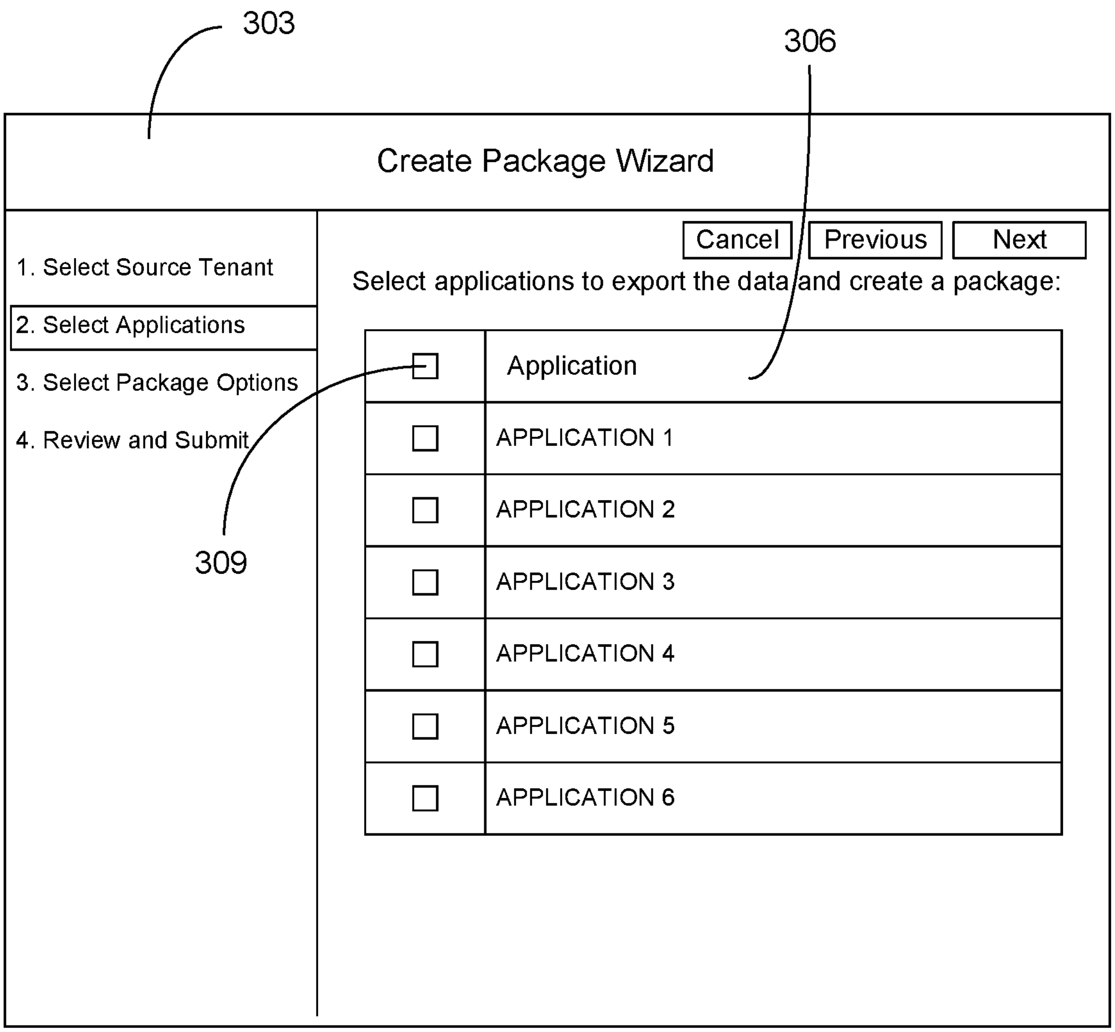

FIG. 3B shows one example of a user interface 303 corresponding to an application selection screen of the create package wizard implemented by the package export service 121. In the user interface 303, a user can select particular applications 138 (FIG. 1) for exporting data and creating a package 152. For example, a user can click a corresponding checkbox for selecting particular applications 138 in the listing that are installed in the source tenant environment 118. A primary checkbox 309 may be provided to select all applications 138 concurrently.

Figure 3C:
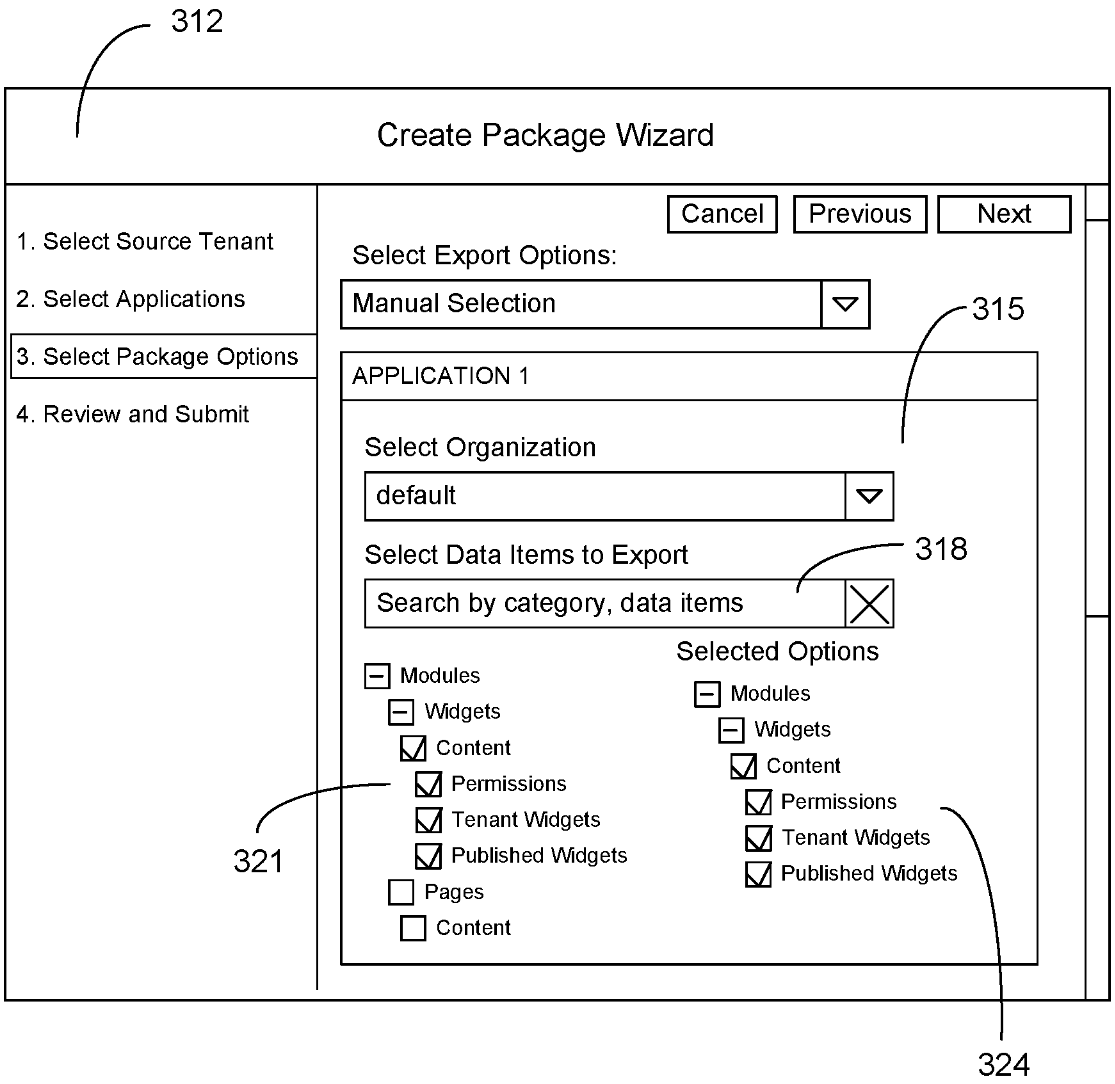

FIG. 3C shows one example of a user interface 312 corresponding to a package options selection screen of a create package wizard implemented by the package export service 121. In the user interface 312, the user may select export options, such as manual selection, or automatic selection driven by a rule set. For each application 138 selected in the user interface 303, an application options panel 315 may be included in the user interface 312. Options in the application options panel 315 may include an organization option or other options. The application options panel 315 may include a search function 318 to search by a query the data items 166 (FIG. 1) in the source tenant environment 118. Entering a search query in the search function 318 may result in automatic selection of data items 166 that match the search query.

A hierarchy 321 may allow users to drill down into the application data 142 to select particular data items 166 for particular organizations, categories, and so on. The hierarchy 321 may display groupings corresponding to content data 144 (FIG. 2), configuration data 146 (FIG. 2), extension data 148 (FIG. 2), security authorization data 150 (FIG. 2), and/or other application data 142. The hierarchy 321 may include a number of checkboxes for selecting particular data items 166 or particular groupings or sub-groupings of data items 166. A selected hierarchy 324 may indicate the subset of the hierarchy 321 that has been selected for export, while excluding data items 166 and groupings that are not selected in the hierarchy 321.

Figure 3D:
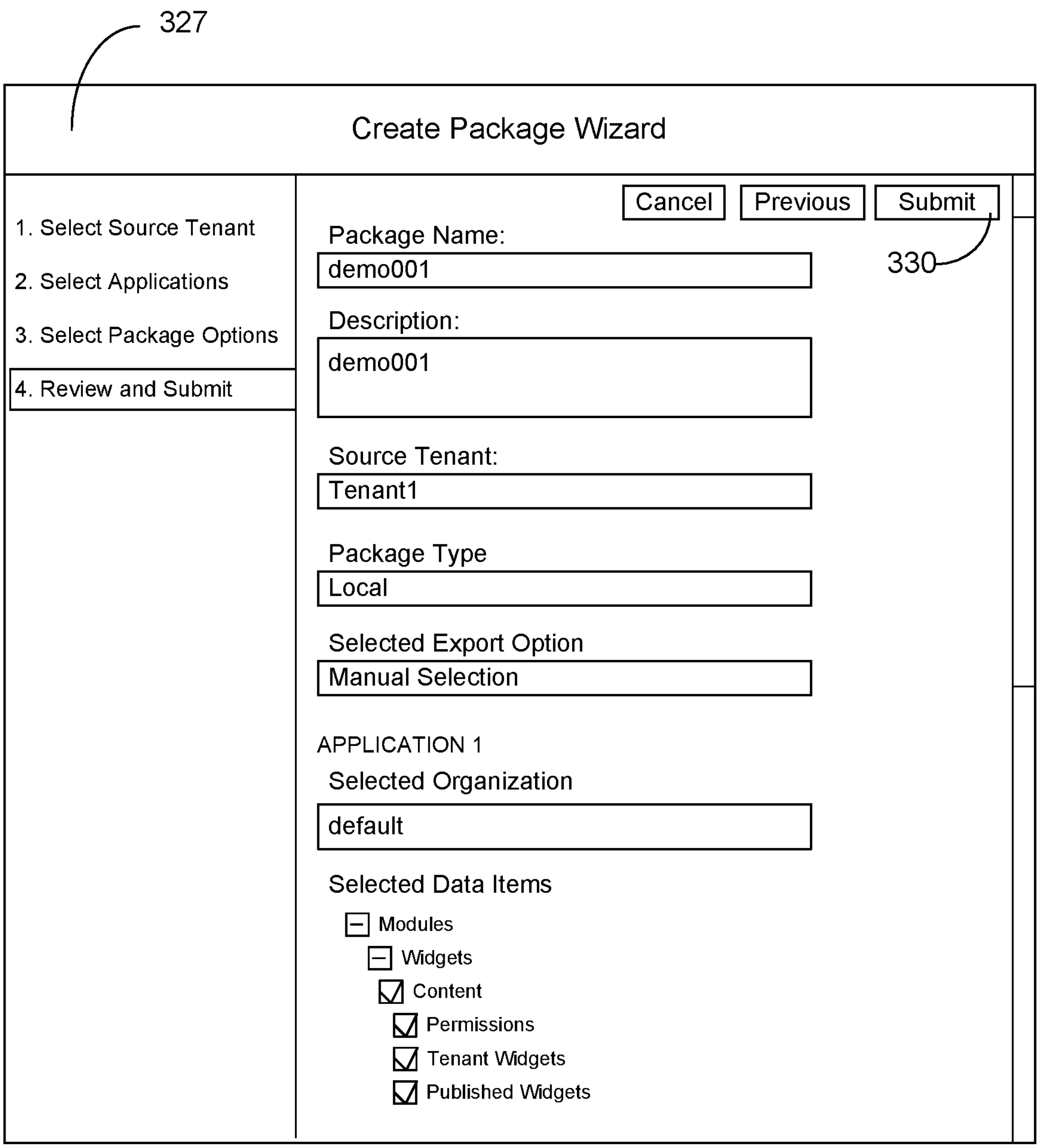

FIG. 3D shows one example of a user interface 327 corresponding to a review and submit screen of a create package wizard implemented by the package export service 121. The user interface 327 provides a summary of the options and data entered on previous screens. For example, the user interface 327 may show the entered package name, the entered description, the selected source tenant environment 118, the package type, a selected export option, and for each application 138, a selected organization and selected data items 166. In this screen, a user may select a submit component 330 that causes the package export service 121 to create the package 152 corresponding to the options selected as shown in the user interface 327.

Figure 4A:
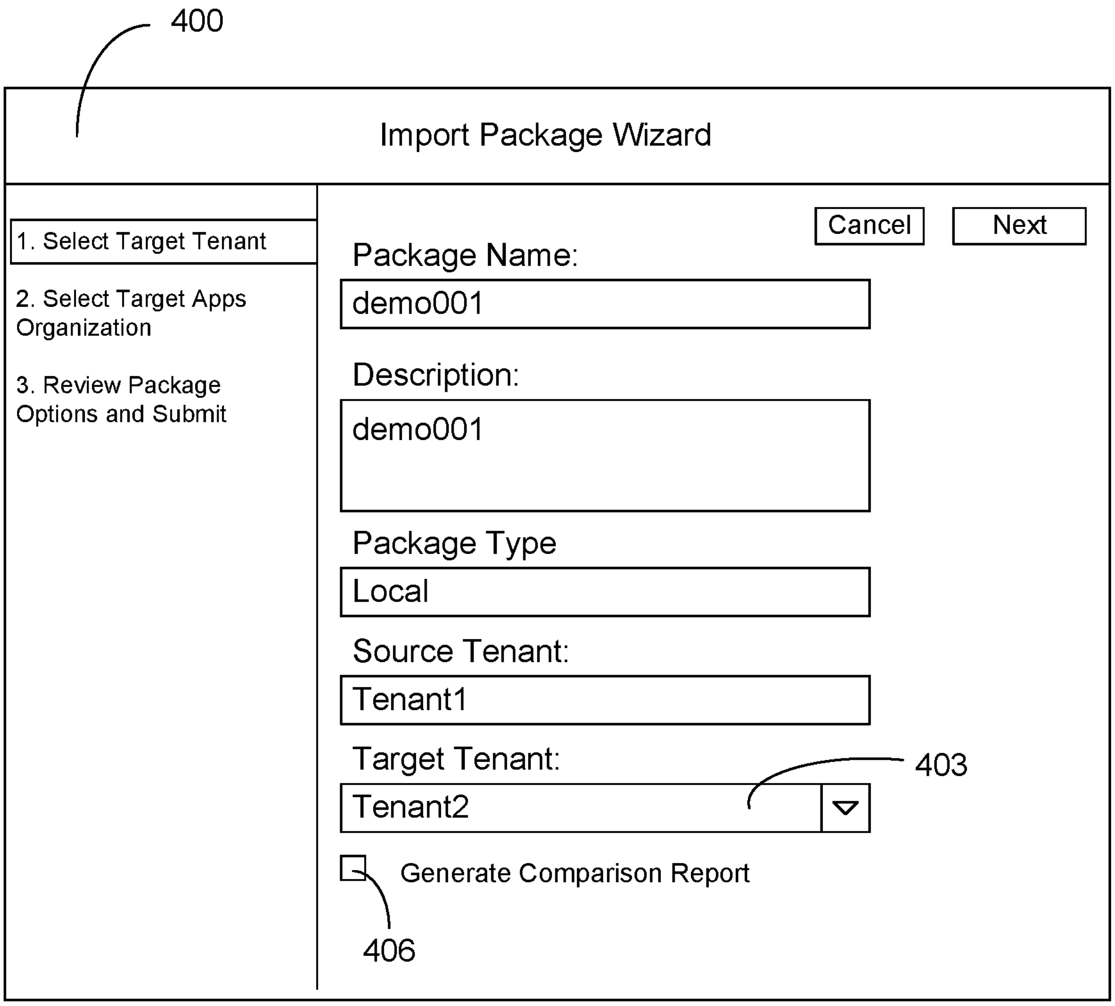
FIGS. 4A-4C are pictorial diagrams of example user interfaces corresponding to a package import process rendered by a client computing device in the networked environment of FIG. 1 according to various embodiments of the present disclosure.

Turning to FIG. 4A, shown is one example of a user interface 400 corresponding to a target tenant environment 118 selection screen for an import package wizard of a package import service 124 (FIG. 1). In the user interface 400 a user may specify a package name of a package 152 to the imported. The description of the package 152 corresponding to the package name may also be shown, along with whether the package 152 is a local package 152 or a global package 152. The source tenant environment 118 used to generate the package may be shown, and the target tenant environment 118 for importing the package 152 may be selected. For example, a drop-down component may be used to select from among the different tenant environments 118 of a given customer entity or account. An option may be provided via the component 406 (e.g., a checkbox) to generate a comparison report 154 (FIG. 1) for the user to review before the package 152 is imported to the target tenant environment 118.

Figure 4B:
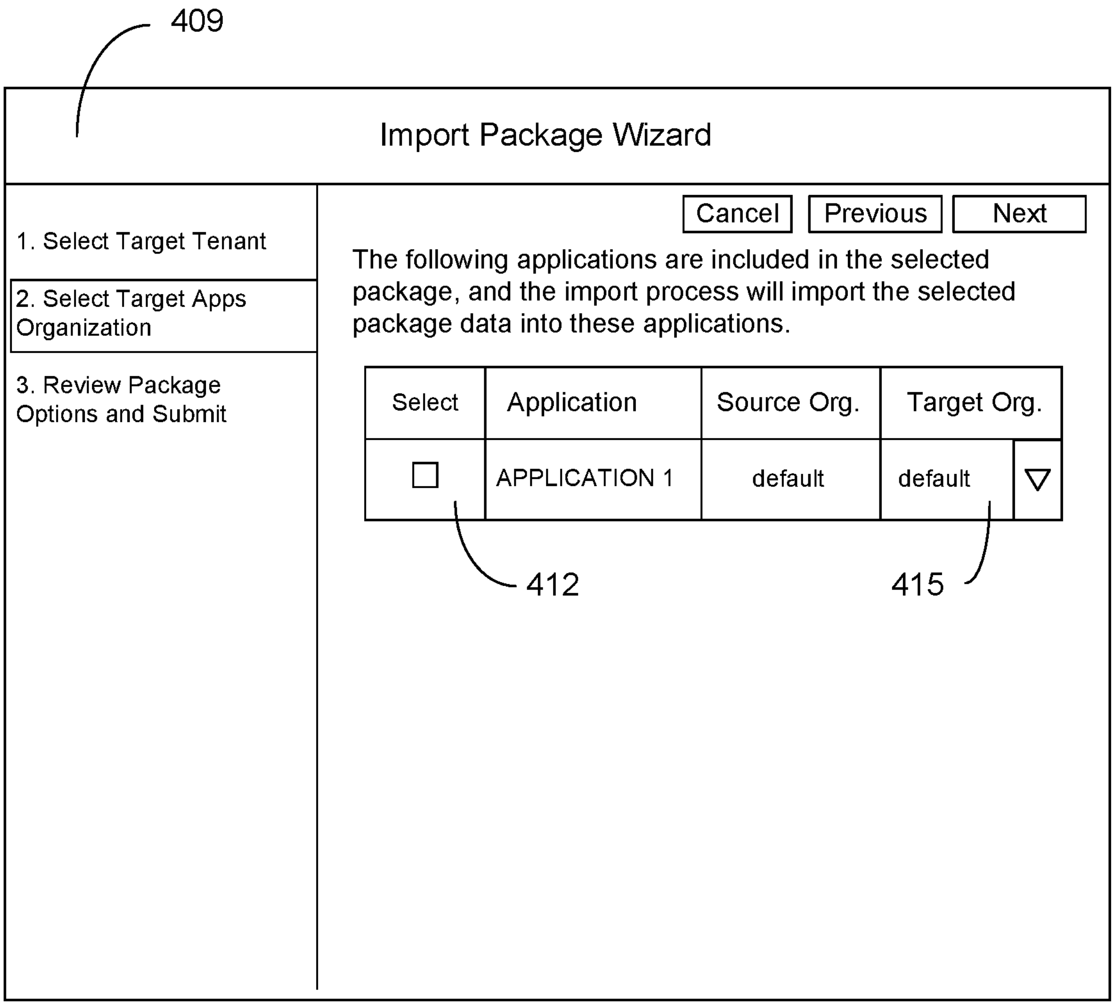

FIG. 4B shows one example of a user interface 409 corresponding to a target application 138 selection screen for an import package wizard of the package import service 124. In the user interface 409, a user can select from the applications 138 that have data specified in a selected package 152. In this example, only one application 138 is shown as being included in the package 152, but other numbers of applications 138 may have data exported to the package 152 in other examples. In addition to specifying particular applications 138 from the package 152, a user may also specify a target organization. For example, a drop-down box 415 may be used to select from possible organizations configured in the organization data 174 (FIG. 1) for the customer account.

Figure 4C:
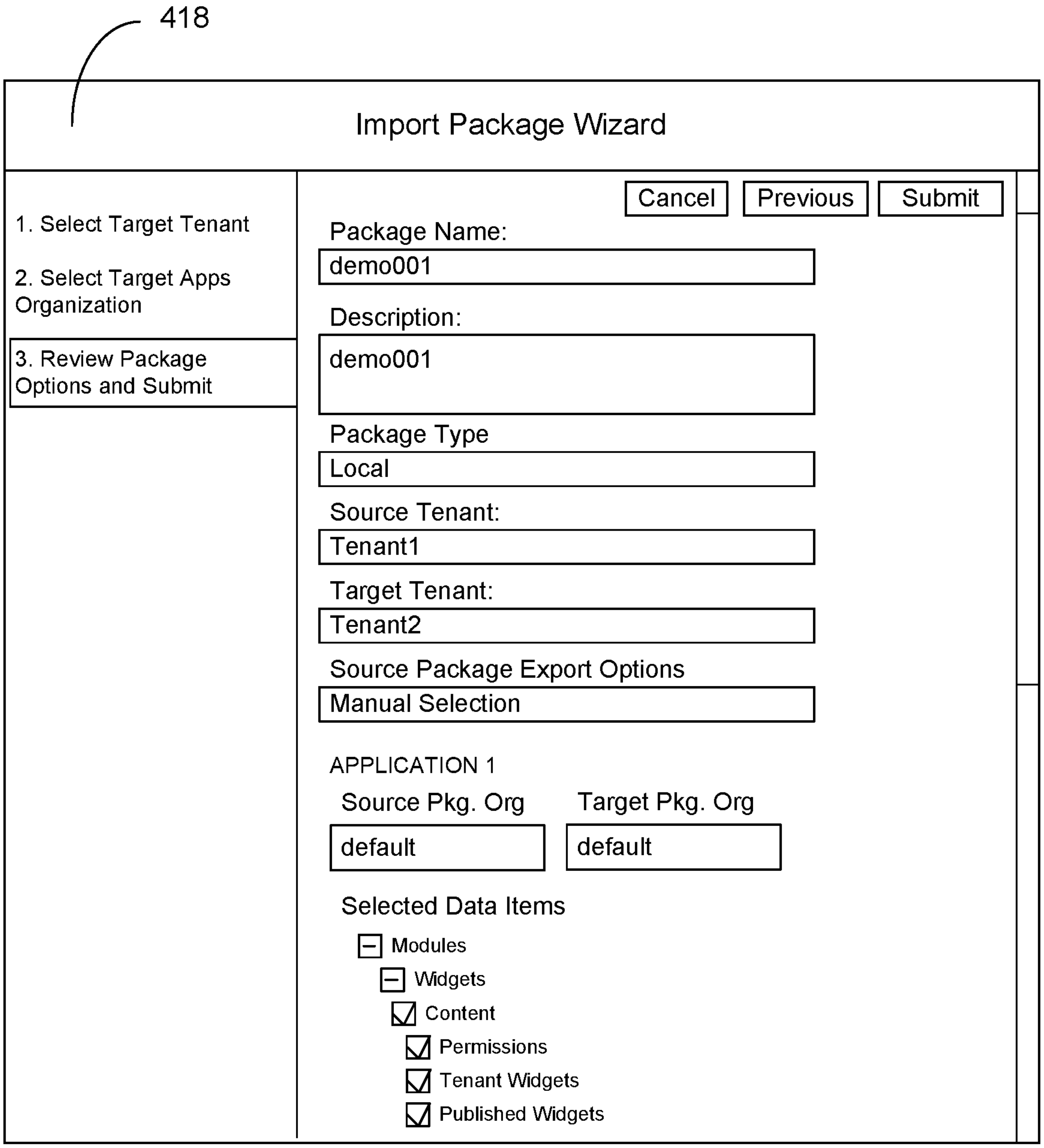

FIG. 4C shows one example of a user interface 418 corresponding to a review and submit screen of an import package wizard implemented by the package import service 124. The user interface 418 provides a summary of the options and data entered on previous screens. For example, the user interface 418 may display the selected package name, the corresponding description of the package 152, whether the package 152 is a local package 152 or a global package 152, the source tenant environment 118, the target tenant environment 118, selected package export options, and for each application 138, a source organization, a target organization, and data items 166 selected for that package 152. From the user interface 418, a user may deselect certain data items 166 or groupings of data items 166 to be imported.

Figure 5:
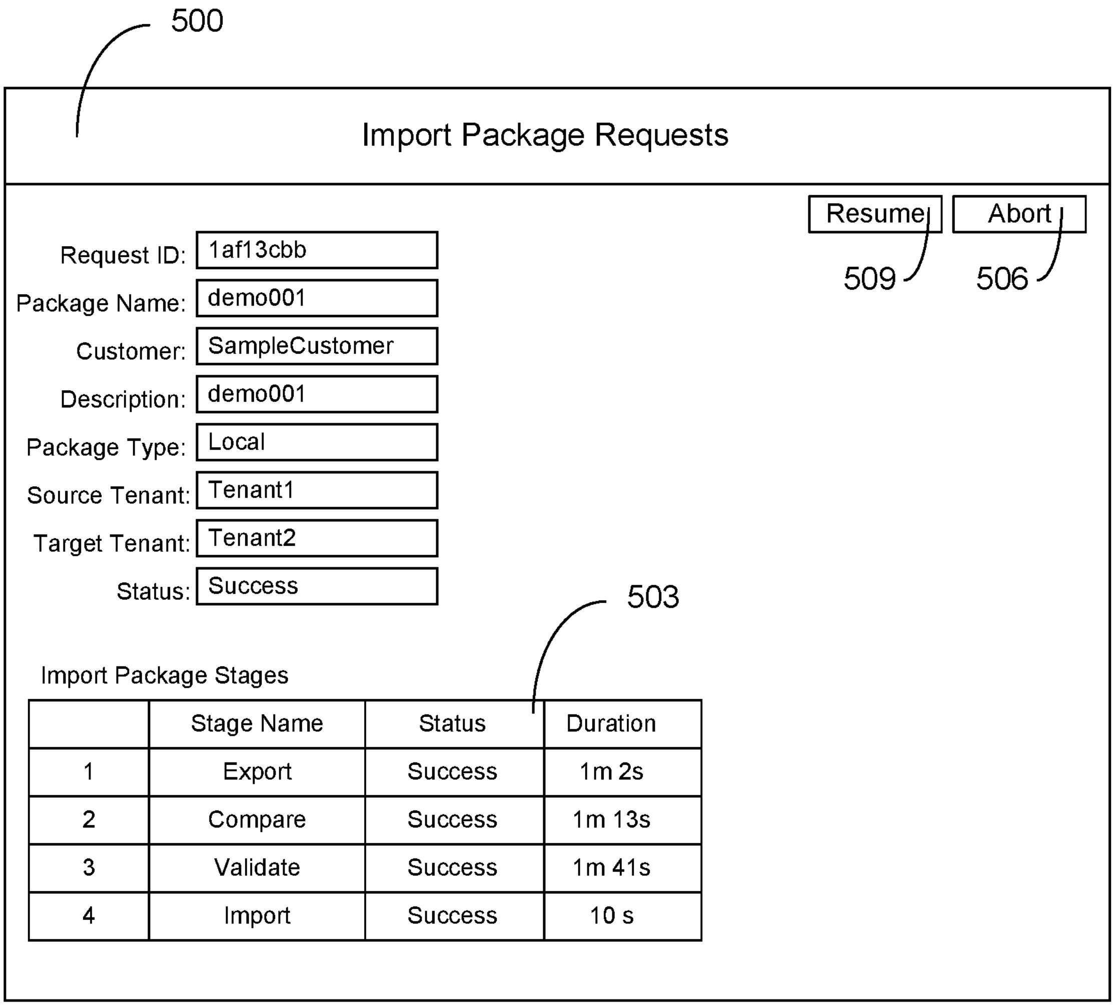
FIG. 5 is a pictorial diagram of an example user interface corresponding to a status of one or more package import requests rendered by a client computing device in the networked environment of FIG. 1 according to various embodiments of the present disclosure.

Referring next to FIG. 5, shown is a user interface 500 generated by the package import service 124 that presents the status of one or more pending or completed package import requests. Some of the information presented in the user interface 500 may include a unique identifier of the import request, the name of the package 152 to be imported, an identifier of the customer account, the description of the package 152, whether the package 152 is a local package 152 or a global package 152, the source tenant environment 118, the target tenant environment 118, a status of the import process, and/or other data.

The user interface 500 may also present a detailed status table 503 for the import request showing the stages of the import process that have been completed, that are processing, or have yet to begin. The processes may be performed according to a predefined sequence. For example, the detailed status table 503 may indicate statuses for a package export process performed by the package export service 121, a comparison report generation process performed by the comparison report generation service 127, a validation process performed by the validation service 130, and the import process performed by the package import service 124.

Information about the respective processes may include the respective status (e.g., success, pending, failure), the time duration for the process to complete, the user who initiated the process, the time the process was initiated, the time at which the process was completed, and other information. Selection of a respective entry in the detailed status table 503 may cause additional information to be presented, such as a comparison report 154, results of the validation process, and/or other information. A component 506 may allow a user to stop or abort a pending process, while a component 509 may allow a user to resume or restart a stopped process.

Figure 6:
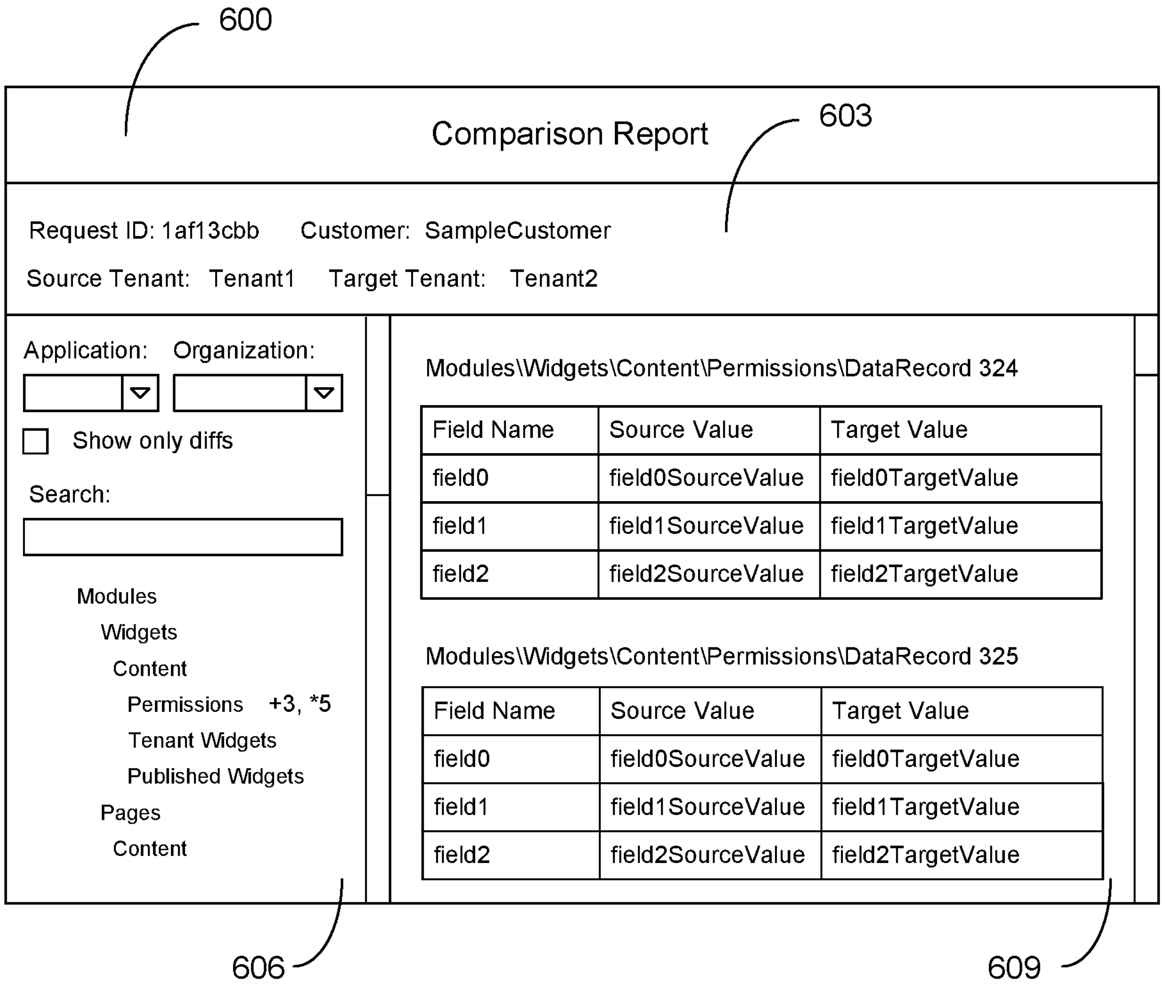
FIG. 6 is a pictorial diagram of an example user interface corresponding to a comparison report rendered by a client computing device in the networked environment of FIG. 1 according to various embodiments of the present disclosure.

Turning now to FIG. 6, shown is one example of a user interface 600 that presents a comparison report 154 generated by the comparison report generation service 127. The user interface 600 may include an information region 603 that presents various information about the request to import a package 152. Such information in the information region 603 may include an import request identifier, a customer identifier, a source tenant environment 118, a target tenant environment 118, and/or other information.

The user interface 600 may include a navigation panel 606 that facilitates a user to view the comparison report 154 by specific application 138 and/or by a specific organization. An option may allow a user to specify that only data items 166 that are different are shown. A search query field may enable the user to enter a search query for a particular data item 166 or group of data items 166. The navigation panel 606 may also include a data hierarchy of the package 152 along with indications of data items 166 that are added or modified (e.g., "+3" may indicate that three data items 166 in a group are added, while "*5" may indicate that five data items 166 in the group are modified).

A comparison display area 609 in the user interface 600 shows the data items 166 that are affected. For example, for each data item 166 matching criteria selected in the navigation panel 606, the comparison display area 609 may show field names, source values, and target values for the data items 166. This enables a user to quickly see what changes are proposed to be made in the target tenant environment 118 based upon the data imported from the package 152.

Figure 7:
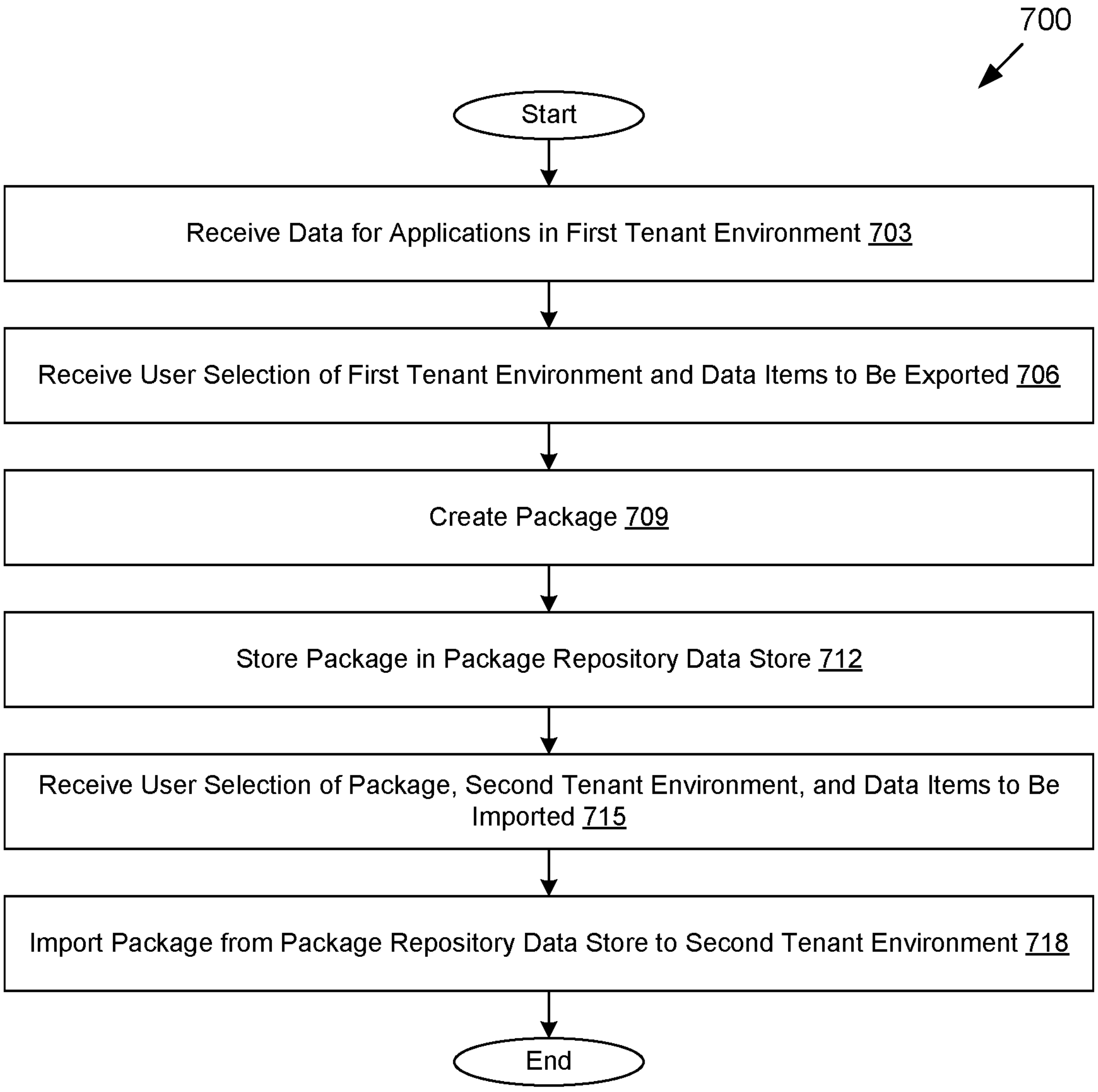
FIG. 7 is a flowchart illustrating one example of functionality implemented as portions of a package export service and a package import service executed in a computing environment in the networked environment of FIG. 1 according to various embodiments of the present disclosure.

Referring next to FIG. 7, shown is a flowchart 700 that provides one example of the operation of a portion of the package export service 121 (FIG. 1) and the package import service 124 (FIG. 1) according to various embodiments. It is understood that the flowchart 700 provides merely an example of the many different types of functional arrangements that may be employed to implement the operation of the portion of the package export service 121 and the package import service 124 as described herein. As an alternative, the flowchart 700 may be viewed as depicting an example of elements of a method implemented in the computing environment 103 (FIG. 1) according to one or more embodiments.

Beginning with box 703, data is received for a plurality of applications 138 (FIG. 1) in a tenant environment 118 (FIG. 1) of a customer account. For example, a user may employ a client application 176 (FIG. 1) executed on a client computing device 106 (FIG. 1) to enter application data 142 (FIG. 1) via the tenant customization API 136 (FIG. 1), such as a web-based interface. Alternatively, the tenant environment 118 may be set up initially using one or more base packages 152 (FIG. 1) according to one or more package import rules 170 (FIG. 1) that control automatic imports of packages 152 upon deployment of a tenant environment 118. The data items 166 (FIG. 1) of the application data 142 that are received may include, for example, content data 144 (FIG. 2), configuration data 146 (FIG. 2), extension data 148 (FIG. 2), security authorization data 150 (FIG. 2), and other data. The application data 142 may be stored in the data store 140 (FIG. 2) of the tenant environment 118.

In box 706, the package export service 121 receives a user selection of a first tenant environment 118 and an indication of one or more data items 166 to be exported. For example, a user may enter information on a select source tenant screen of a create package wizard user interface 300 as shown in FIG. 3A. In populating a list of possible source tenant environments 118, the package export service 121 may identify the customer account, then identify the tenant environments 118 associated with the customer account. The tenant environments 118 associated with the customer account are used to populate the list of possible source tenant environments 118. The user may also select particular applications 138 for which the corresponding application data 142 is to be exported, e.g., by way of a user interface 303 (FIG. 3B).

In various embodiments, the user may further drill down into the application data 142, e.g., by way of a user interface 312 (FIG. 3C), to select or deselect particular data items 166 or groupings of data items 166. The data items 166 may be arranged in a hierarchy 321 (FIG. 3C) (e.g., a hierarchical list) of a set of applications 138, where individual applications 138 of the set are user selectable for inclusion or exclusion. The hierarchy 321 may include respective selectable components for selecting particular categories of the data to be exported for the individual applications 138 of the set of applications 138. The selected data items 166 from the hierarchy 321 may be shown adjacent to the hierarchy 321 as a selected hierarchy 324 (FIG. 3C). The user may also use a search function 318 (FIG. 3C) to search for data items 166 in the hierarchy 321 to be selected or deselected. Where a source tenant environment 118 is associated with multiple organizations, the user may specify the application data 142 associated with a specific one of the organizations.

In one embodiment, a user may select the data items 166 to be exported by way of associating a tag with the data items 166. For example, the user may interact with the tenant customization API 136 to associate a given tag with particular applications 138 or data items 166. In this way, the package export service 121 is able to identify the selected data as being all data items 166 that are associated with the selected tag. In some cases, given data items 166 may be associated with a plurality of different tags in order to create packages 152 of different scope.

In box 709, the package export service 121 creates a package 152 for the selected application data 142. For example, the package 152 may be created by exporting the selected application data 142. The package 152 may be created in a user-specified namespace 156 (FIG. 1) and with a unique code 158 (FIG. 1). The package 152 may also have a user-specified description. The package export service 121 may verify that a user-entered namespace 156 and/or code 158 are globally unique in the package repository data store 112 (FIG. 1). In various examples, the package 152 may be created as a local package 152 that can be imported only into tenant environments 118 of the same customer account, or as a global package 152 that can be imported into tenant environments 118 of other customer accounts. Where another version 164 (FIG. 1) exists of the same package 152 (e.g., same namespace 156 and code 158), the package export service 121 may increment the version 164 when exporting the package 152. In some embodiments, the validation service 130 (FIG. 1) may ensure that all necessary dependencies 162 (FIG. 1) have been selected in creating the package 152.

In box 712, the package export service 121 stores the generated package 152 in the package repository data store 112 via the package repository service 133 (FIG. 1). If the package 152 is a local package 152, the package repository service 133 may make the package 152 available only to the same customer account that created the package 152. If the package 152 is a global package 152, the package repository service 133 may make the package 152 available to other customer accounts, potentially for a fee. If the package 152 is a global package 152, the package repository service 133 may perform additional scanning and verification on the package 152 to ensure that the package 152 does not pose security or operational risks to other customer accounts. For example, the package repository service 133 may determine that the package 152 does not overwrite certain data items 166 with data that would cause the corresponding applications 138 not to function or to exfiltrate business data outside of tenant environment 118 into which the package 152 is installed. In some scenarios, a user may later convert, via the package repository service 133, a local package 152 that is available for import to tenant environments 118 of a single customer account into a global package 152 that is available for import to tenant environments 118 of a plurality of customer accounts.

In box 715, the package import service 124 receives a user selection of a package 152, a second tenant environment 118, and one or more data items 166 to be imported into the second tenant environment 118. Alternatively, the package 152 may be determined to be imported automatically into the second tenant environment 118 (e.g., upon deployment or provisioning of the second tenant environment 118) according to one or more package import rules 170 (FIG. 1) and/or a deployment order for the second tenant environment 118. In some embodiments, the user may select the package 152 by way of a package marketplace facilitated by the package repository service 133.

In some embodiments, the user may complete one or more forms of an import package wizard. For example, via the user interface 400 (FIG. 4A), the user may specify a package 152 and a target tenant environment 118 via the drop-down box 403 (FIG. 4A). The drop-down box 403 may be populated with a list of potential tenant environments 118 that are associated with the customer account. In some cases, the target tenant environment 118 may be the same as the source tenant environment 118, which may result in resetting the target tenant environment 118 to an earlier state. The user may also specify via the user interface 400 whether a comparison report 154 (FIG. 1) should be generated as part of the import process. In the user interface 409 (FIG. 4B), the user may select one or more applications 138 for which application data 142 is provided in the package 152. The user may also select a target organization within the target tenant environment 118, if the customer account is associated with a plurality of different organizations. In the user interface 418 (FIG. 4C), the user can select or deselect specific data items 166 or groupings of data items 166 that are included in package 152 for import to the target tenant environment 118. In some cases, a user may want all of the data items 166 in the package 152 to be imported, but in other cases, the user may want only one or more of the data items 166 in the package 152 to be imported.

In box 718, the package import service 124 proceeds to import the selected data items 166 of the package 152 from the package repository data store 112 to the second tenant environment 118. In this way, the package import service 124 can import respective portions of the selected data items 166 in one or more applications 138, which may include customizing the operation of one or more applications 138. For example, the package import service 124 may configure or reconfigure one or more applications 138 using configuration data 146, add or modify content for one or more applications 138 using content data 144, extend or modify an extension of functionality of one or more applications 138 using extension data 148, create or modify authorizations using the security authorization data 150, and so forth.

In the import process, the package import service 124 may facilitate generation and display of a comparison report 154 by the comparison report generation service 127 (FIG. 1). The package import service 124 may also facilitate a validation process performed by the validation service 130 (FIG. 1) to identify unmet dependencies 162 (FIG. 1) or other incompatibilities. Depending on the comparison report 154 or the validation process, the user may choose to stop or abandon the import process, or to revert to an earlier stage to select different data. As part of the import process, the package import service 124 proceeds to copy the selected data items 166 from the package 152 to the target tenant environment 118, which may involve adding new data items 166 to, or overwriting existing data items 166 in, the target tenant environment 118. As such, the package import service 124 applies the data of the package 152 to the applications 138 in the target tenant environment 118. Thereafter, the operation of the flowchart 700 ends.

Figure 8:
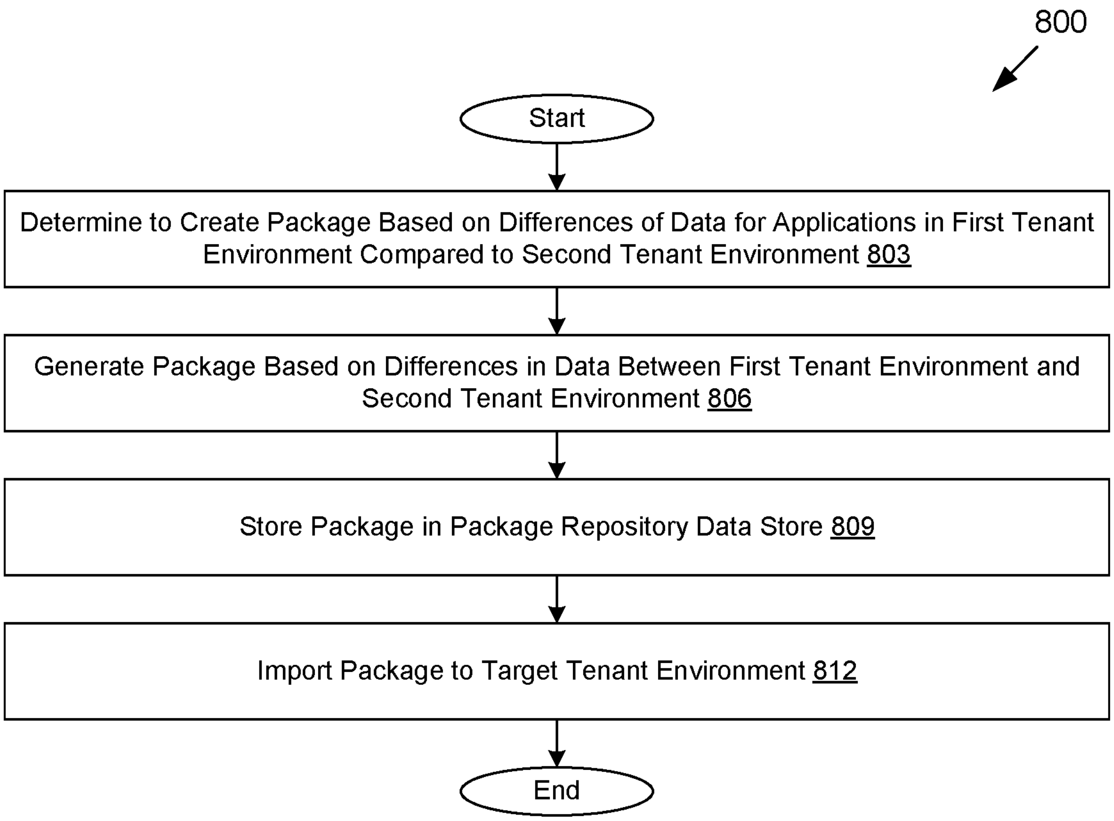
FIG. 8 is a flowchart illustrating one example of functionality implemented as portions of a package export service and a package import service executed in a computing environment in the networked environment of FIG. 1 according to various embodiments of the present disclosure.

Turning now to FIG. 8, shown is a flowchart 800 that provides one example of the operation of a portion of the package export service 121 (FIG. 1) and the package import service 124 (FIG. 1) according to various embodiments. It is understood that the flowchart 800 provides merely an example of the many different types of functional arrangements that may be employed to implement the operation of the portion of the package export service 121 and the package import service 124 as described herein. As an alternative, the flowchart 800 may be viewed as depicting an example of elements of a method implemented in the computing environment 103 (FIG. 1) according to one or more embodiments.

Beginning with box 803, the package export service 121 determines to create a package 152 (FIG. 1) based at least in part on differences in data between a first tenant environment 118 (FIG. 1) and a second tenant environment 118. The data may correspond to application data 142 (FIG. 2), such as content data 144 (FIG. 2), configuration data 146 (FIG. 2), extension data 148 (FIG. 2), security authorization data 150 (FIG. 2), and/or other data. For example, the differences may include that the first tenant environment 118 has an application 138 (FIG. 2) installed, but the second tenant environment 118 does not, or that the application data 142 of the first tenant environment 118 has additional data items 166 (FIG. 1) not present in the application data 142 of the second tenant environment 118.

In various examples, a user may enter information on a select source tenant screen of a create package wizard user interface 300. In populating a list of possible source tenant environments 118, the package export service 121 may identify the customer account, then identify the tenant environments 118 associated with the customer account. The tenant environments 118 associated with the customer account are used to populate the list of possible source tenant environments 118. The user may also select particular applications 138 for which the corresponding application data 142 is to be exported, e.g., by way of a user interface 303 (FIG. 3B). Compared to user interface 300, the user may select two source tenant environments 118 in order to generate the package 152 based at least in part on the differences between the two.

In various embodiments, the user may further drill down into the application data 142, e.g., by way of a user interface 312 (FIG. 3C), to select or deselect particular data items 166 or groupings of data items 166. The data items 166 may be arranged in a hierarchy 321 (FIG. 3C) (e.g., a hierarchical list) of a set of applications 138, where individual applications 138 of the set are user selectable for inclusion or exclusion. The hierarchy 321 may include respective selectable components for selecting particular categories of the data to be exported for the individual applications 138 of the set of applications 138. The selected data items 166 from the hierarchy 321 may be shown adjacent to the hierarchy 321 as a selected hierarchy 324 (FIG. 3C). The user may also use a search function 318 (FIG. 3C) to search for data items 166 in the hierarchy 321 to be selected or deselected. Where a source tenant environment 118 is associated with multiple organizations, the user may specify the application data 142 associated with a specific one of the organizations.

In one embodiment, a user may select the data items 166 to be exported by way of associating a tag with the data items 166. For example, the user may interact with the tenant customization API 136 to associate a given tag with particular applications 138 or data items 166. In this way, the package export service 121 is able to identify the selected data as being all data items 166 that are associated with the selected tag that are within the determined differences between the two tenant environments 118. In some cases, given data items 166 may be associated with a plurality of different tags in order to create packages 152 of different scope.

In box 806, the package export service 121 generates a package 152 based at least in part on the differences in data between the first tenant environment 118 and the second tenant environment 118. The package 152 may be created in a user-specified namespace 156 (FIG. 1) and with a unique code 158 (FIG. 1). The package 152 may also have a user-specified description. In various examples, the package 152 may be created as a local package 152 that can be imported only into tenant environments 118 of the same customer account, or as a global package 152 that can be imported into tenant environments 118 of other customer accounts. Where another version 164 (FIG. 1) exists of the same package 152 (e.g., same namespace 156 and code 158), the package export service 121 may increment the version 164 when exporting the package 152.

In box 809, the package export service 121 stores the generated package 152 in the package repository data store 112 (FIG. 1) via the package repository service 133 (FIG. 1). If the package 152 is a local package 152, the package repository service 133 may make the package 152 available only to the same customer account that created the package 152. If the package 152 is a global package 152, the package repository service 133 may make the package 152 available to other customer accounts, potentially for a fee. If the package 152 is a global package 152, the package repository service 133 may perform additional scanning and verification on the package 152 to ensure that the package 152 does not pose security or operational risks to other customer accounts. For example, the package repository service 133 may determine that the package 152 does not overwrite certain data items 166 with data that would cause the corresponding applications 138 not to function or to exfiltrate business data outside of tenant environment 118 into which the package 152 is installed.

In box 812, the package import service 124 imports the package 152 to a target tenant environment 118. In this way, the package import service 124 can import respective portions of the selected data items 166 in one or more applications 138, which may include customizing the operation of one or more applications 138. For example, the package import service 124 may configure or reconfigure one or more applications 138 using configuration data 146, add or modify content for one or more applications 138 using content data 144, extend or modify an extension of functionality of one or more applications 138 using extension data 148, create or modify authorizations using the security authorization data 150, and so forth.

In the import process, the package import service 124 may receive a user selection of the package 152, the target tenant environment 118, and one or more data items 166 to be imported into the target tenant environment 118. For example, the target tenant environment 118 may be selected from a list of tenant environments 118 associated with the customer account. Alternatively, the package 152 may be determined to be imported automatically into the target tenant environment 118 (e.g., upon deployment or provisioning of the target tenant environment 118) according to one or more package import rules 170 (FIG. 1) and/or a deployment order. In some embodiments, the user may select the package 152 by way of a package marketplace facilitated by the package repository service 133.

In some embodiments, the user may complete one or more forms of an import package wizard. For example, via the user interface 400 (FIG. 4A), the user may specify a package 152 and a target tenant environment 118 via the drop-down box 403 (FIG. 4A). The drop-down box 403 may be populated with a list of potential tenant environments 118 that are associated with the customer account. The user may also specify via the user interface 400 whether a comparison report 154 (FIG. 1) should be generated as part of the import process. In the user interface 409 (FIG. 4B), the user may select one or more applications 138 for which application data 142 is provided in the package 152. The user may also select a target organization within the target tenant environment 118, if the customer account is associated with a plurality of different organizations. In the user interface 418 (FIG. 4C), the user can select or deselect specific data items 166 or groupings of data items 166 that are included in package 152 for import to the target tenant environment 118. In some cases, a user may want all of the data items 166 in the package 152 to be imported, but in other cases, the user may want only one or more of the data items 166 in the package 152 to be imported.

As part of importing the data, the package import service 124 may facilitate generation and display of a comparison report 154 by the comparison report generation service 127 (FIG. 1). The package import service 124 may also facilitate a validation process performed by the validation service 130 (FIG. 1) to identify unmet dependencies 162 (FIG. 1) or other incompatibilities. Depending on the comparison report 154 or the validation process, the user may choose to stop or abandon the import process, or to revert to an earlier stage to select different data. As part of the import process, the package import service 124 proceeds to copy the selected data items 166 from the package 152 to the target tenant environment 118, which may involve adding new data items 166 to, or overwriting existing data items 166 in, the target tenant environment 118. Accordingly, the differences in the data are applied to the applications 138 in the target tenant environment 118. Thereafter, the operation of the flowchart 800 ends.

Figure 9:
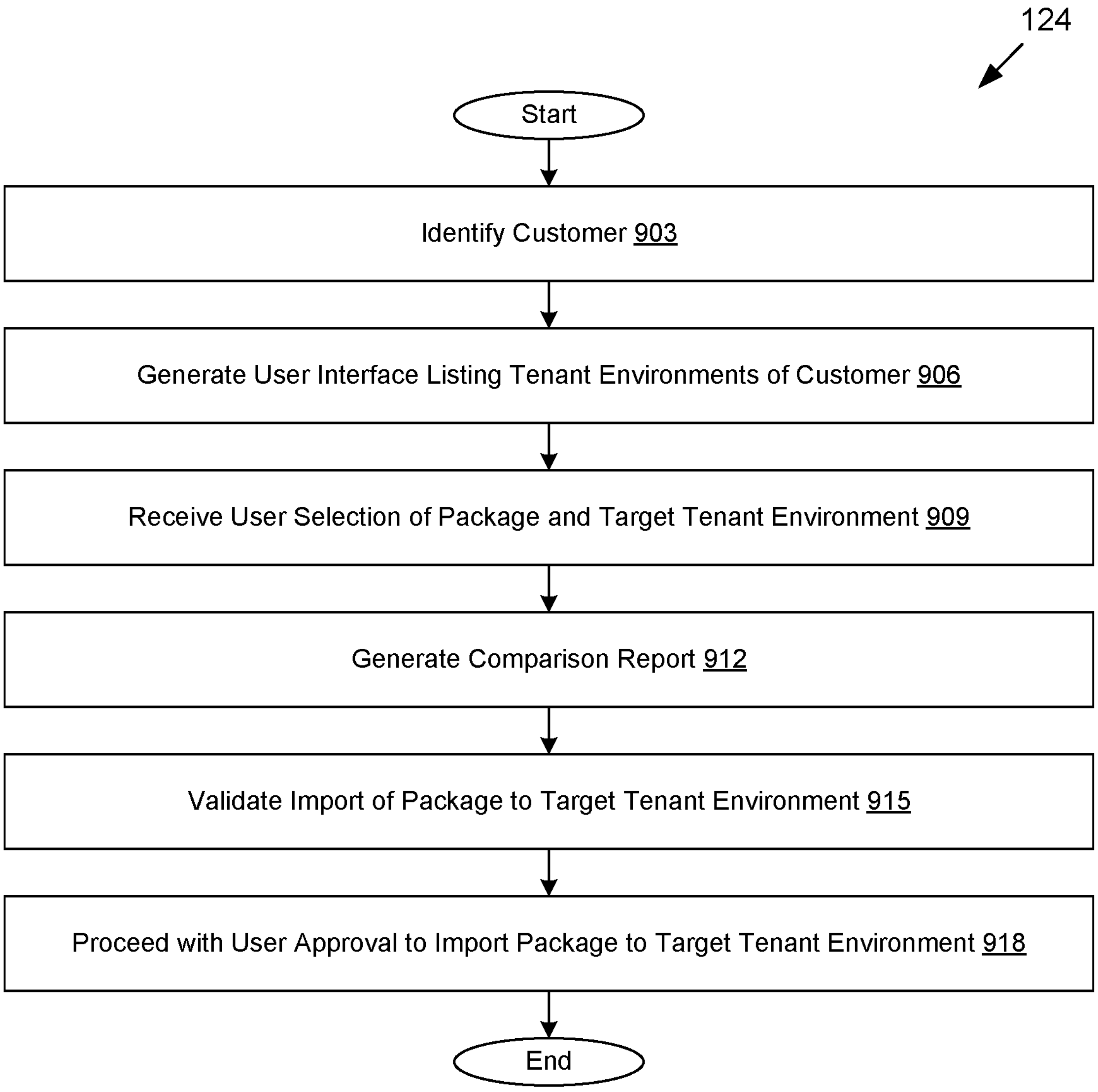
FIG. 9 is a flowchart illustrating one example of functionality implemented as portions of a package import service executed in a computing environment in the networked environment of FIG. 1 according to various embodiments of the present disclosure.

Referring next to FIG. 9, shown is a flowchart that provides one example of the operation of a portion of the package import service 124 according to various embodiments. It is understood that the flowchart of FIG. 9 provides merely an example of the many different types of functional arrangements that may be employed to implement the operation of the portion of the package import service 124 as described herein. As an alternative, the flowchart of FIG. 9 may be viewed as depicting an example of elements of a method implemented in the computing environment 103 (FIG. 1) according to one or more embodiments.

Beginning with box 903, the package import service 124 identifies a customer account associated with a user account. For example, the user may employ a client application 176 (FIG. 1) to authenticate with the package import service 124, and based at least in part on the authentication, a customer account is identified. The package import service 124 may then determine the tenant environments 118 (FIG. 1) that are associated with the customer account within the multi-tenant, multi-customer networked system of the computing environment 103.

In box 906, the package import service 124 generates a user interface that lists the tenant environments 118 associated with the customer account. For example, the package import service 124 may generate a user interface 400 (FIG. 4A) for a screen of an import package wizard. In box 909, the package import service 124 receives a user selection of a package 152 (FIG. 1) and a target tenant environment 118. For example, the selections may be by way of a user interface 400. In some cases, the target tenant environment 118 may be a newly created tenant environment for the customer account.

In box 912, the package import service 124 causes the comparison report generation service 127 (FIG. 1) to generate a comparison report 154 (FIG. 1). The comparison report 154, which may be presented in a user interface 600

(FIG. 6), presents a comparison of differences between the data in the package 152 and the data in the target tenant environment 118.

In box 915, the package import service 124 causes the validation service 130 (FIG. 1) to validate the import of the package 152 to the target tenant environment 118. For example, the validation service 130 may identify one or more unmet dependencies 162 (FIG. 1) of the package 152 in the target tenant environment 118. For example, the validation service 130 may determine whether the dependencies 162 of the package 152 are currently installed in the target tenant environment 118. The validation service 130 may also identify one or more incompatibilities or compatibility issues between the package 152 and the target tenant environment 118. The results of the validation may comprise a validation report accessible via the user interface 500 (FIG. 5).

In box 918, the package import service 124 proceeds, upon receiving user approval, with importing the package 152 to the target tenant environment 118. Depending on the comparison report 154 or the validation process, the user may choose to stop or abandon the import process, or to revert to an earlier stage to select different data. As part of the import process, the package import service 124 proceeds to copy the selected data items 166 (FIG. 1) from the package 152 to the target tenant environment 118, which may involve adding new data items 166 to, or overwriting existing data items 166 in, the target tenant environment 118.

In this way, the package import service 124 can import respective portions of the selected data items 166 in one or more applications 138, which may include customizing the operation of one or more applications 138. For example, the package import service 124 may configure or reconfigure one or more applications 138 using configuration data 146, add or modify content for one or more applications 138 using content data 144, extend or modify an extension of functionality of one or more applications 138 using extension data 148, create or modify authorizations using the security authorization data 150, and so forth. Thereafter, the operation of the portion of the package import service 124 ends.

Figure 10:
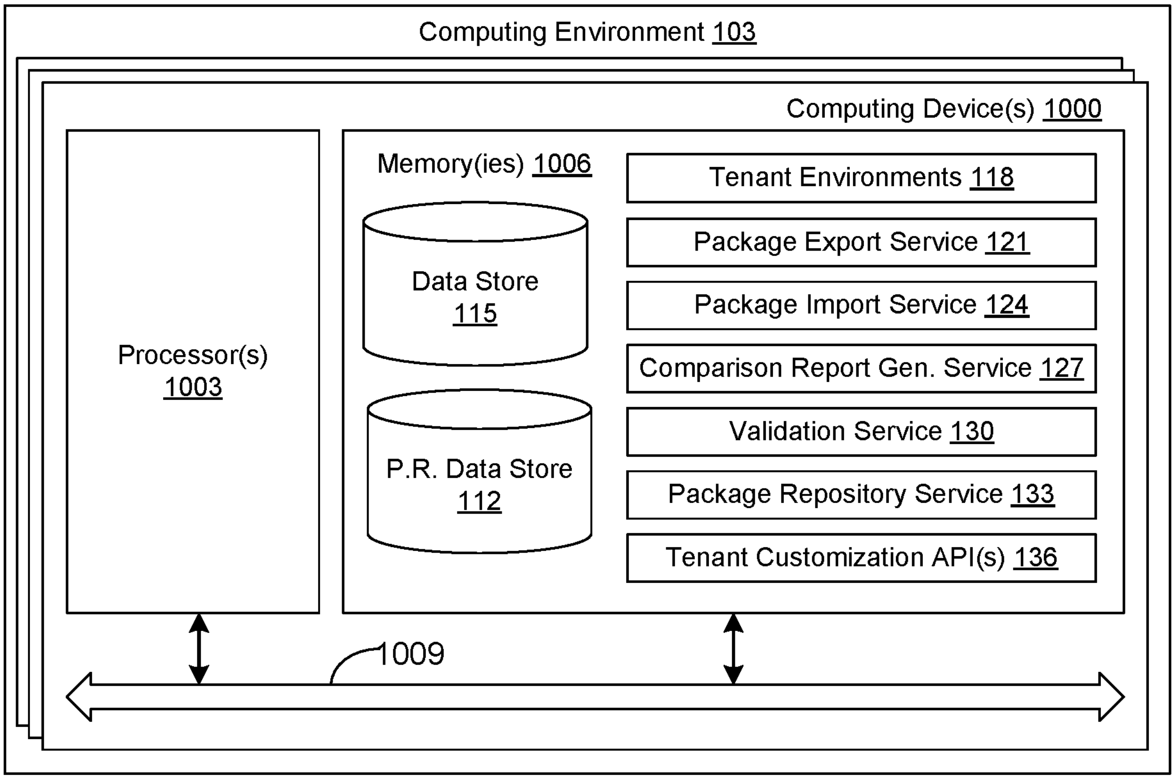
FIG. 10 is a schematic block diagram that provides one example illustration of a computing environment employed in the networked environment of FIG. 1 according to various embodiments of the present disclosure.

With reference to FIG. 10, shown is a schematic block diagram of the computing environment 103 according to an embodiment of the present disclosure. The computing environment 103 includes one or more computing devices 1000. Each computing device 1000 includes at least one processor circuit, for example, having a processor 1003 and a memory 1006, both of which are coupled to a local interface 1009. To this end, each computing device 1000 may comprise, for example, at least one server computer or like device. The local interface 1009 may comprise, for example, a data bus with an accompanying address/control bus or other bus structure as can be appreciated.

Stored in the memory 1006 are both data and several components that are executable by the processor 1003. In particular, stored in the memory 1006 and executable by the processor 1003 are the tenant environments 118, the package export service 121, the package import service 124, the comparison report generation service 127, the validation service 130, the package repository service 133, the tenant customization API 136, and potentially other applications. Also stored in the memory 1006 may be a data store 115, a package repository data store 112, and other data. In addition, an operating system may be stored in the memory 1006 and executable by the processor 1003.

It is understood that there may be other applications that are stored in the memory 1006 and are executable by the processor 1003 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 1006 and are executable by the processor 1003. In this respect, the term "executable" means a program file that is in a form that can ultimately be run by the processor 1003. Examples of executable programs may be, for example, a compiled program that can be translated into machine code in a format that can be loaded into a random access portion of the memory 1006 and run by the processor 1003, source code that may be expressed in proper format such as object code that is capable of being loaded into a random access portion of the memory 1006 and executed by the processor 1003, or source code that may be interpreted by another executable program to generate instructions in a random access portion of the memory 1006 to be executed by the processor 1003, etc. An executable program may be stored in any portion or component of the memory 1006 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 1006 is defined herein as including both volatile and nonvolatile memory and data storage components. Volatile components are those that do not retain data values upon loss of power. Nonvolatile components are those that retain data upon a loss of power. Thus, the memory 1006 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 1003 may represent multiple processors 1003 and/or multiple processor cores and the memory 1006 may represent multiple memories 1006 that operate in parallel processing circuits, respectively. In such a case, the local interface 1009 may be an appropriate network that facilitates communication between any two of the multiple processors 1003, between any processor 1003 and any of the memories 1006, or between any two of the memories 1006, etc. The local interface 1009 may comprise additional systems designed to coordinate this communication, including, for example, performing load balancing. The processor 1003 may be of electrical or of some other available construction.

Although the tenant environments 118, the package export service 121, the package import service 124, the comparison report generation service 127, the validation service 130, the package repository service 133, the tenant customization API 136, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 7-9 show the functionality and operation of an implementation of portions of the package export service 121 and the package import service 124. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 1003 in a computer system or other system. The machine code may be converted from the source code, etc. If embodied in hardware, each block may represent a circuit or a number of interconnected circuits to implement the specified logical function(s).

Although the flowcharts of FIGS. 7-9 show a specific order of execution, it is understood that the order of execution may differ from that which is depicted. For example, the order of execution of two or more blocks may be scrambled relative to the order shown. Also, two or more blocks shown in succession in FIGS. 7-9 may be executed concurrently or with partial concurrence. Further, in some embodiments, one or more of the blocks shown in FIGS. 7-9 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the tenant environments 118, the package export service 121, the package import service 124, the comparison report generation service 127, the validation service 130, the package repository service 133, and the tenant customization API 136, that comprises software or code can be embodied in any non-transitory computer-readable medium for use by or in connection with an instruction execution system such as, for example, a processor 1003 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the tenant environments 118, the package export service 121, the package import service 124, the comparison report generation service 127, the validation service 130, the package repository service 133, and the tenant customization API 136, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 1000, or in multiple computing devices 1000 in the same computing environment 103.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Embodiments of the present disclosure may be described in one or more of the following clauses:

Clause 1. A computer-implemented method, comprising: receiving data for a plurality of applications in a first tenant environment of a networked system; exporting the data as a package; storing the package in a package repository data store; and importing the package from the package repository data store to a second tenant environment of the networked system, thereby performing one or more actions with respective portions of the data to configure operation of the plurality of applications in the second tenant environment.

Clause 2. The computer-implemented method of clause 1, further comprising converting the package from a local package that is available for import to tenant environments of a customer account in the networked system to a global package that is available for import to tenant environments of a plurality of customer accounts in the networked system.

Clause 3. The computer-implemented method of clauses 1 to 2, wherein importing the package from the package repository data store further comprises automatically determining to import the package to the second tenant environment based at least in part on a deployment order for the second tenant environment and one or more package import rules.

Clause 4. The computer-implemented method of clauses 1 to 3, further comprising: receiving an entry of a namespace; verifying that the namespace is globally unique in the package repository data store; and wherein exporting the data as the package further comprises creating the package having the namespace after verifying that the namespace is globally unique.

Clause 5. The computer-implemented method of clauses 1 to 4, further comprising receiving a user selection of one or more data items of the data to be imported to the second tenant environment.

Clause 6. The computer-implemented method of clauses 1 to 5, further comprising receiving a user selection of the first tenant environment from a plurality of tenant environments.

Clause 7. The computer-implemented method of clauses 1 to 6, further comprising receiving a user selection of the second tenant environment from a plurality of tenant environments.

Clause 8. The computer-implemented method of clauses 1 to 7, further comprising receiving a user selection of the plurality of applications for which the data is exported.

Clause 9. The computer-implemented method of clause 8, further comprising generating a user interface displaying a hierarchical list of a set of applications, wherein individual applications of the set of applications are user selectable for inclusion in or exclusion from the package.

Clause 10. The computer-implemented method of clause 9, wherein the hierarchical list includes respective selectable components for selecting particular categories of the data to be exported for the individual applications of the set of applications.

Clause 11. The computer-implemented method of clauses 1 to 10, wherein the data comprises content data, configuration data, security authorization data, and extension data.

Clause 12. The computer-implemented method of clause 1, wherein individual data items in the data of the package are associated with a respective unique uniform resource name (URN).

Clause 13. The computer-implemented method of clauses 1 to 12, further comprising: associating a tag with individual data items in the data; and wherein exporting the data as the package further comprises identifying the data for export based at least in part on the data being associated with the tag.

Clause 14. The computer-implemented method of clauses 1 to 13, further comprising generating a comparison report indicating corresponding data items of the data in the package that are different from data of the second tenant environment.

Clause 15. The computer-implemented method of clauses 1 to 14, wherein the networked system comprises a cloud-based enterprise resource planning (ERP) system.

Clause 16. The computer-implemented method of clauses 1 to 15, wherein the first tenant environment and the second tenant environment are associated with a single customer account of the networked system, and the package is created as a local package available to the single customer account.

Clause 17. The computer-implemented method of clauses 1 to 16, wherein the first tenant environment and the second tenant environment are associated with different customer accounts of the networked system, and the package is created as a global package available to a plurality of customer accounts of the networked system.

Clause 18. A system, comprising: a package repository data store; a multi-tenant networked system; at least one computing device; and instructions executable in the at least one computing device, wherein when executed the instructions cause the at least one computing device to at least: receive data for a plurality of applications in a first tenant environment of the multi-tenant networked system; export the data as a package; store the package in the package repository data store; and import the package from the package repository data store to a second tenant environment of the multi-tenant networked system, thereby performing one or more actions with respective portions of the data to configure operation of the plurality of applications in the second tenant environment.

Clause 19. The system of clause 18, wherein the package repository data store stores a plurality of local packages available for import by a respective exporting customer account and a plurality of global packages available for import by a plurality of customer accounts.

Clause 20. A non-transitory computer-readable medium embodying a program executable in at least one computing device, wherein when executed the program causes the at least one computing device to at least: receive data for a plurality of applications in a first tenant environment of a networked system; export the data as a package; store the package in a package repository data store; and import the package from the package repository data store to a second tenant environment of the networked system, thereby performing one or more actions with respective portions of the data to configure operation of the plurality of applications in the second tenant environment.

Clause 21. A computer-implemented method, comprising: determining to create a package corresponding to differences in data for a plurality of applications in a first tenant environment of a networked system as compared to a second tenant environment of the networked system; generating the package based at least in part on the differences in the data for the plurality of applications in the first tenant environment as compared to the second tenant environment; and storing the package in a package repository data store.

Clause 22. The computer-implemented method of clause 21, further comprising importing the package from the package repository data store to a third tenant environment of the networked system, thereby performing one or more actions with respective portions of the differences in the data to configure operation of the plurality of applications in the third tenant environment.

Clause 23. The computer-implemented method of clause 22, wherein importing the package from the package repository data store further comprises automatically determining to import the package to the third tenant environment based at least in part on a deployment order for the third tenant environment and one or more package import rules.

Clause 24. The computer-implemented method of clauses 22 to 23, further comprising receiving a user selection of one or more data items of the data to be imported to the third tenant environment.

Clause 25. The computer-implemented method of clauses 22 to 24, further comprising receiving a user selection of the third tenant environment from a plurality of tenant environments.

Clause 26. The computer-implemented method of clauses 22 to 25, further comprising generating a comparison report indicating corresponding data items of the data in the package that are different from data of the third tenant environment.

Clause 27. The computer-implemented method of clauses 21 to 26, further comprising importing the package from the package repository data store to the first tenant environment, thereby performing one or more actions with respective portions of the differences in the data to configure operation of the first tenant environment.

Clause 28. The computer-implemented method of clauses 21 to 27, wherein the data comprises content data, configuration data, security authorization data, and extension data.

Clause 29. The computer-implemented method of clauses 21 to 28, wherein individual data items in the data of the package are associated with a respective unique uniform resource name (URN).

Clause 30. The computer-implemented method of clauses 21 to 29, wherein the networked system comprises a cloud-based enterprise resource planning (ERP) system.

Clause 31. A system, comprising: a package repository data store; a multi-tenant networked system; at least one computing device; and instructions executable in the at least one computing device, wherein when executed the instructions cause the at least one computing device to at least: determine to create a package corresponding to differences in data for a plurality of applications in a first tenant environment of the multi-tenant networked system as compared to a second tenant environment of the multi-tenant networked system; generate the package based at least in part on the differences in the data for the plurality of applications in the first tenant environment as compared to the second tenant environment; and store the package in the package repository data store.

Clause 32. The system of clause 31, wherein the instructions further cause the at least one computing device to at least import the package from the package repository data store to a third tenant environment of the multi-tenant networked system, thereby performing one or more actions with respective portions of the differences in the data to configure operation of the plurality of applications in the third tenant environment.

Clause 33. The system of clauses 31 to 32, wherein the instructions further cause the at least one computing device to at least generate a comparison report indicating corresponding data items of the data in the package that are different from data of a third tenant environment.

Clause 34. The system of clauses 31 to 33, wherein the instructions further cause the at least one computing device to at least import the package from the package repository data store to the first tenant environment, thereby performing one or more actions with respective portions of the data to configure operation of the first tenant environment.

Clause 35. The system of clauses 31 to 34, wherein the data comprises content data, configuration data, security authorization data, and extension data. \

Clause 36. The system of clauses 31 to 35, wherein individual data items in the data of the package are associated with a respective unique uniform resource name (URN).

Clause 37. The system of clauses 31 to 36, wherein the multi-tenant networked system comprises a cloud-based enterprise resource planning (ERP) system.

Clause 38. A non-transitory computer-readable medium embodying a program executable in at least one computing device, wherein when executed the program causes the at least one computing device to at least: determine to create a package corresponding to differences in data for a plurality of applications in a first tenant environment of a multi-tenant networked system as compared to a second tenant environment of the multi-tenant networked system; generate the package based at least in part on the differences in the data for the plurality of applications in the first tenant environment as compared to the second tenant environment; and store the package in a package repository data store.

Clause 39. The non-transitory computer-readable medium of clause 38, wherein when executed the program further causes the at least one computing device to at least automatically determining to import the package to a third tenant environment based at least in part on a deployment order for the third tenant environment and one or more package import rules.

Clause 40. The non-transitory computer-readable medium of clauses 38 to 39, wherein when executed the program further causes the at least one computing device to at least receive a user selection of one or more data items of the data to be imported to a third tenant environment.

Clause 41. A computer-implemented method, comprising: receiving a selection of a package and of a target tenant environment into which the package is to be imported, the target tenant environment being one of a plurality of tenant environments in a multi-tenant networked system, the package including customization data for a plurality of applications; and generating a comparison report indicating corresponding data items of the customization data in the package that are different from data of the target tenant environment.

Clause 42. The computer-implemented method of clause 41, further comprising: identifying a customer account associated with a request to import the package; and generating a user interface listing a plurality of tenant environments of the customer account for selection as the target tenant environment.

Clause 43. The computer-implemented method of clauses 41 to 42, wherein the package is selected from a plurality of packages in a package repository data store.

Clause 44. The computer-implemented method of clauses 41 to 43, further comprising: identifying a dependency of the package on a second package; and determining whether the target tenant environment has the second package installed.

Clause 45. The computer-implemented method of clauses 41 to 44, further comprising identifying whether the package has a compatibility issue with the target tenant environment.

Clause 46. The computer-implemented method of clauses 41 to 45, further comprising receiving a user approval of the comparison report before proceeding with an import of the package to the target tenant environment.

Clause 47. The computer-implemented method of clauses 41 to 46, further comprising: receiving a user selection of a portion of the customization data; and importing the package to the target tenant environment, thereby customizing one or more of the plurality of applications in the target tenant environment using the portion of the customization data.

Clause 48. The computer-implemented method of clause 47, wherein importing the package to the target tenant environment comprises overwriting one or more first data items in the target tenant environment with one or more second data items in the customization data.

Clause 49. The computer-implemented method of clauses 41 to 48, wherein the customization data comprises content data, configuration data, security authorization data, and extension data.

Clause 50. The computer-implemented method of clauses 41 to 49, wherein individual data items in the customization data of the package are associated with a respective unique uniform resource name (URN).

Clause 51. The computer-implemented method of clauses 41 to 50, wherein the multi-tenant networked system comprises a cloud-based enterprise resource planning (ERP) system.

Clause 52. A system, comprising: a multi-tenant networked system having a plurality of tenant environments; at least one computing device; and instructions executable in the at least one computing device, wherein when executed the instructions cause the at least one computing device to at least: receive a selection of a package and of a target tenant environment into which the package is to be imported, the target tenant environment being one of the plurality of tenant environments, the package including customization data for a plurality of applications; and generate a comparison report indicating corresponding data items of the customization data in the package that are different from data of the target tenant environment.

Clause 53. The system of clause 52, wherein the instructions further cause the at least one computing device to at least: identify a customer account associated with a request to import the package; and generate a user interface listing a plurality of tenant environments of the customer account for selection as the target tenant environment.

Clause 54. The system of clauses 52 to 53, wherein the instructions further cause the at least one computing device to at least: identify a dependency of the package on a second package; and determine whether the target tenant environment has the second package installed.

Clause 55. The system of clauses 52 to 54, wherein the instructions further cause the at least one computing device to at least identify whether the package has a compatibility issue with the target tenant environment.

Clause 56. The system of clauses 52 to 55, wherein the instructions further cause the at least one computing device to at least receive a user approval of the comparison report before proceeding with an import of the package to the target tenant environment.

Clause 57. The system of clauses 52 to 56, wherein the instructions further cause the at least one computing device to at least: receive a user selection of a portion of the customization data; and import the package to the target tenant environment, thereby customizing one or more of the plurality of applications in the target tenant environment using the portion of the customization data.

Clause 58. The system of clauses 52 to 57, wherein the customization data comprises content data, configuration data, security authorization data, and extension data.

Clause 59. A non-transitory computer-readable medium embodying a program executable in at least one computing device, wherein when executed the program causes the at least one computing device to at least: receive a selection of a package and of a target tenant environment into which the package is to be imported, the target tenant environment being one of a plurality of tenant environments in a multi-tenant networked system, the package including customization data for a plurality of applications; and generate a comparison report indicating corresponding data items of the customization data in the package that are different from data of the target tenant environment.

Clause 60. The non-transitory computer-readable medium of clause 59, wherein when executed the program further causes the at least one computing device to at least: identify a customer account associated with a request to import the package; and generate a user interface listing a plurality of tenant environments of the customer account for selection as the target tenant environment.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A computer-implemented method, comprising:

determining to create a package corresponding to differences in data for a plurality of different applications in a first tenant environment of a cloud computing resource as compared to a second tenant environment of the cloud computing resource, the first tenant environment and the second tenant environment being separate application environments in the cloud computing resource, the package comprising a collection of data items that configure application operation;

generating the package based at least in part on the differences in the data for the plurality of different applications in the first tenant environment as compared to the second tenant environment; and storing the package in a package repository data store.

2. The computer-implemented method of claim 1, further comprising importing the package from the package repository data store to a third tenant environment of the networked system, thereby performing one or more actions with respective portions of the differences in the data to configure operation of the plurality of different applications in the third tenant environment.

3. The computer-implemented method of claim 2, wherein importing the package from the package repository data store further comprises automatically determining to import the package to the third tenant environment based at least in part on a deployment order for the third tenant environment and one or more package import rules.

4. The computer-implemented method of claim 2, further comprising receiving a user selection of one or more data items of the data to be imported to the third tenant environment.

5. The computer-implemented method of claim 2, further comprising receiving a user selection of the third tenant environment from a plurality of tenant environments.

6. The computer-implemented method of claim 2, further comprising generating a comparison report indicating corresponding data items of the data in the package that are different from data of the third tenant environment.

7. The computer-implemented method of claim 1, further comprising importing the package from the package repository data store to the first tenant environment, thereby performing one or more actions with respective portions of the differences in the data to configure operation of the first tenant environment.

8. The computer-implemented method of claim 1, wherein the data comprises content data, configuration data, security authorization data, and extension data.

9. The computer-implemented method of claim 1, wherein individual data items in the data of the package are associated with a respective unique uniform resource name (URN).

10. The computer-implemented method of claim 1, wherein the networked system comprises a cloud-based enterprise resource planning (ERP) system.

11. A system, comprising:

a package repository data store;

a multi-tenant networked system comprising a cloud computing resource;

at least one computing device; and instructions executable in the at least one computing device, wherein when executed the instructions cause the at least one computing device to at least:

determine to create a package corresponding to differences in data for a plurality of different applications in a first tenant environment of the multi-tenant networked system as compared to a second tenant environment of the multi-tenant networked system, the first tenant environment and the second tenant environment being separate application environments in the cloud computing resource, the package comprising a collection of data items that configure application operation;

generate the package based at least in part on the differences in the data for the plurality of different applications in the first tenant environment as compared to the second tenant environment; and store the package in the package repository data store.

12. The system of claim 11, wherein the instructions further cause the at least one computing device to at least import the package from the package repository data store to a third tenant environment of the multi-tenant networked system, thereby performing one or more actions with respective portions of the differences in the data to configure operation of the plurality of different applications in the third tenant environment.

13. The system of claim 11, wherein the instructions further cause the at least one computing device to at least generate a comparison report indicating corresponding data items of the data in the package that are different from data of a third tenant environment.

14. The system of claim 11, wherein the instructions further cause the at least one computing device to at least import the package from the package repository data store to the first tenant environment, thereby performing one or more actions with respective portions of the data to configure operation of the first tenant environment.

15. The system of claim 11, wherein the data comprises content data, configuration data, security authorization data, and extension data.

16. The system of claim 11, wherein individual data items in the data of the package are associated with a respective unique uniform resource name (URN).

17. The system of claim 11, wherein the multi-tenant networked system comprises a cloud-based enterprise resource planning (ERP) system.

18. A non-transitory computer-readable medium embodying a program executable in at least one computing device, wherein when executed the program causes the at least one computing device to at least:

determine to create a package corresponding to differences in data for a plurality of different applications in a first tenant environment of a multi-tenant networked system as compared to a second tenant environment of the multi-tenant networked system, the multi-tenant networked system comprising a cloud computing resource, the first tenant environment and the second tenant environment being separate application environments in the cloud computing resource, the package comprising a collection of data items that configure application operation;

generate the package based at least in part on the differences in the data for the plurality of different applications in the first tenant environment as compared to the second tenant environment; and store the package in a package repository data store.

19. The non-transitory computer-readable medium of claim 18, wherein when executed the program further causes the at least one computing device to at least automatically determining to import the package to a third tenant environment based at least in part on a deployment order for the third tenant environment and one or more package import rules.

20. The non-transitory computer-readable medium of claim 18, wherein when executed the program further causes the at least one computing device to at least receive a user selection of one or more data items of the data to be imported to a third tenant environment.

* * * * *